US007569812B1

(12) United States Patent
Karpetsky et al.

(10) Patent No.: US 7,569,812 B1
(45) Date of Patent: Aug. 4, 2009

(54) REMOTE REAGENT ION GENERATOR

(75) Inventors: Timothy P. Karpetsky, Towson, MD (US); John C. Berends, Jr., Bel Air, MD (US); Edward W. Sheehan, Pittsburgh, PA (US); Ross C. Willoughby, Pittsburgh, PA (US)

(73) Assignee: Science Applications International Corporation, San Diego, CA (US)

( * ) Notice: Subject to any disclaimer, the term of this patent is extended or adjusted under 35 U.S.C. 154(b) by 228 days.

(21) Appl. No.: 11/544,252

(22) Filed: Oct. 7, 2006

Related U.S. Application Data

(63) Continuation of application No. 11/120,363, filed on May 2, 2005, now Pat. No. 7,095,019.

(60) Provisional application No. 60/724,399, filed on Oct. 7, 2005.

(51) Int. Cl.
*B01D 59/44* (2006.01)
*H01J 49/00* (2006.01)

(52) U.S. Cl. ........................ 250/282; 250/281; 250/283; 250/288; 250/294; 435/4; 435/6; 435/287.1; 435/287.2; 435/40.5; 435/71.1

(58) Field of Classification Search ................. 250/281, 250/282, 283, 288, 294; 435/4, 6, 287.1, 435/287.2, 40.5, 71.1
See application file for complete search history.

(56) References Cited

U.S. PATENT DOCUMENTS 4,000,918 A 1/1977 Reker .......................... 285/93

(Continued)

FOREIGN PATENT DOCUMENTS

GB 2127212 4/1984

(Continued)

OTHER PUBLICATIONS

Hanson, Eric, "How an Ink Jet Printer Works" [online], [retrieved on May 15, 2008], 5 pp., Retrieved from Internet:http://www.imaging.org/resources/web_tutorials/inkjet_files/inkjet.cfm.

(Continued)

*Primary Examiner*—Jack I. Berman
*Assistant Examiner*—Meenakshi S Sahu
(74) *Attorney, Agent, or Firm*—King & Spalding LLP

(57) ABSTRACT

An improved ion source and means for collecting and focusing dispersed gas-phase ions from a remote reagent chemical ionization source (R2CIS) at atmospheric or intermediate pressure is described. The R2CIS is under electronic control and can produce positive, negative, or positive and negative reagent ions simultaneously. This remote source of reagent ions is separated from a low-field sample ionization region by a stratified array of elements, each element populated with a plurality of openings, wherein DC potentials are applied to each element necessary for transferring reagent ions from the R2CIS into the low-field sample ionization region where the reagent ions react with neutral and/or ionic sample forming sample ionic species. The resulting sample ionic species are then introduced into a mass spectrometer, ion mobility spectrometer or other sensor capable of detecting the sample ions. Embodiments of this invention are methods and devices for improving sensitivity of mass spectrometry when gas and liquid chromatographic separation techniques are coupled to atmospheric and intermediate pressure photo-ionization, chemical ionization, and thermospray ionization sources; and improving the sensitivity of chemical detectors or probes.

20 Claims, 19 Drawing Sheets

U.S. PATENT DOCUMENTS

| | | | | |
|---|---|---|---|---|
| 4,159,423 | A | 6/1979 | Kambara | 250/423 R |
| 4,209,696 | A | 6/1980 | Fite | 250/281 |
| 4,271,357 | A | 6/1981 | Bradshaw et al. | 250/287 |
| 4,300,004 | A | 11/1981 | Wissner et al. | 570/211 |
| 4,318,028 | A | 3/1982 | Perel et al. | 315/111.81 |
| 4,468,468 | A | 8/1984 | Benninghoven et al. | 436/173 |
| 4,531,056 | A | 7/1985 | Labowsky et al. | 250/288 |
| 4,542,293 | A | 9/1985 | Fenn et al. | 250/288 |
| 4,546,253 | A | 10/1985 | Tsuchiya et al. | 250/288 |
| 4,789,783 | A | 12/1988 | Cook | 250/379 |
| 4,855,595 | A | 8/1989 | Blanchard | 250/287 |
| 4,948,962 | A | 8/1990 | Mitsui et al. | 250/288 |
| 4,974,648 | A | 12/1990 | Propst | 144/24.13 |
| 4,976,920 | A | 12/1990 | Jacob | 422/23 |
| 4,977,320 | A | 12/1990 | Chowdhury et al. | 250/288 |
| 4,999,492 | A | 3/1991 | Nakagawa | 250/281 |
| 5,141,532 | A | 8/1992 | Sacks et al. | 95/87 |
| 5,142,143 | A | 8/1992 | Fite et al. | 250/288 |
| 5,164,704 | A | 11/1992 | Steen et al. | 340/539.17 |
| 5,168,068 | A | 12/1992 | Yanagisawa et al. | 436/134 |
| 5,171,525 | A | 12/1992 | Jacob | 422/23 |
| 5,192,865 | A | 3/1993 | Zhu | 250/288 |
| 5,280,175 | A | 1/1994 | Karl | 250/287 |
| 5,304,797 | A | 4/1994 | Irie et al. | 250/287 |
| 5,305,015 | A | 4/1994 | Schantz et al. | 347/47 |
| 5,306,910 | A | 4/1994 | Jarrell et al. | 250/286 |
| 5,338,931 | A | 8/1994 | Spangler et al. | 250/287 |
| 5,412,208 | A | 5/1995 | Covey et al. | 250/288 |
| 5,412,209 | A | 5/1995 | Otaka et al. | 250/310 |
| 5,436,446 | A | 7/1995 | Jarrell et al. | 250/288 |
| 5,485,016 | A | 1/1996 | Irie et al. | 250/288 |
| 5,541,519 | A | 7/1996 | Stearns et al. | 324/464 |
| 5,559,326 | A | 9/1996 | Goodley et al. | 250/288 |
| 5,581,081 | A | 12/1996 | Kato et al. | 250/288 |
| 5,587,581 | A | 12/1996 | Stroosnyder | 250/287 |
| 5,625,184 | A | 4/1997 | Vestal et al. | 250/287 |
| 5,684,300 | A | 11/1997 | Taylor et al. | 250/286 |
| 5,736,740 | A | 4/1998 | Franzen | 250/288 |
| 5,747,799 | A | 5/1998 | Franzen | 250/288 |
| 5,750,988 | A | 5/1998 | Apffel et al. | 250/288 |
| 5,753,910 | A | 5/1998 | Gourley et al. | 250/288 |
| 5,756,994 | A | 5/1998 | Bajic | 250/288 |
| 5,798,146 | A | 8/1998 | Murokh et al. | 427/458 |
| 5,828,062 | A | 10/1998 | Jarrell et al. | 250/288 |
| 5,838,002 | A | 11/1998 | Sheehan | 250/288 |
| 5,873,523 | A | 2/1999 | Gomez et al. | 239/3 |
| 5,892,364 | A | 4/1999 | Monagle | 324/464 |
| 5,945,678 | A | 8/1999 | Yanagisawa | 250/423 F |
| 5,965,884 | A | 10/1999 | Laiko et al. | 250/288 |
| 5,986,259 | A | 11/1999 | Hirabayashi et al. | 250/288 |
| 6,040,575 | A | 3/2000 | Whitehouse et al. | 250/288 |
| 6,060,705 | A | 5/2000 | Whitehouse et al. | 250/288 |
| 6,107,628 | A | 8/2000 | Smith et al. | 250/292 |
| 6,124,675 | A | 9/2000 | Bertrand et al. | 315/111.91 |
| 6,147,345 | A | 11/2000 | Willoughby | 250/288 |
| 6,204,500 | B1 | 3/2001 | Whitehouse et al. | 250/287 |
| 6,207,954 | B1 | 3/2001 | Andrien, Jr. et al. | 250/288 |
| 6,223,584 | B1 | 5/2001 | Mustacich et al. | 73/23.41 |
| 6,225,623 | B1 | 5/2001 | Turner et al. | 250/286 |
| 6,239,428 | B1 | 5/2001 | Kunz | 250/287 |
| 6,278,111 | B1 | 8/2001 | Sheehan et al. | 250/288 |
| 6,359,275 | B1 | 3/2002 | Bertsch et al. | 250/281 |
| 6,455,846 | B1 | 9/2002 | Prior et al. | 250/288 |
| 6,462,338 | B1 | 10/2002 | Inatsugu et al. | 250/292 |
| 6,465,776 | B1 | 10/2002 | Moini et al. | 250/285 |
| 6,486,469 | B1 | 11/2002 | Fischer et al. | 250/288 |
| 6,495,823 | B1 | 12/2002 | Miller et al. | 250/286 |
| 6,512,224 | B1 | 1/2003 | Miller et al. | 250/286 |
| 6,534,765 | B1 | 3/2003 | Robb et al. | 250/288 |
| 6,537,817 | B1 | 3/2003 | Papen | 436/49 |
| 6,583,407 | B1 | 6/2003 | Fischer et al. | 250/288 |
| 6,583,408 | B2 | 6/2003 | Smith et al. | 250/288 |
| 6,600,155 | B1 | 7/2003 | Andrien, Jr. et al. | 250/287 |
| 6,610,986 | B2 | 8/2003 | Hartley | 250/423 R |
| 6,649,907 | B2 | 11/2003 | Ebeling et al. | 250/288 |
| 6,683,301 | B2 | 1/2004 | Whitehouse et al. | 250/288 |
| 6,690,004 | B2 | 2/2004 | Miller et al. | 250/286 |
| 6,727,496 | B2 | 4/2004 | Miller et al. | 250/287 |
| 6,744,041 | B2 | 6/2004 | Sheehan et al. | 250/283 |
| 6,750,449 | B2 | 6/2004 | Marcus | 250/288 |
| 6,784,424 | B1 | 8/2004 | Willoughby et al. | 250/292 |
| 6,815,668 | B2 | 11/2004 | Miller et al. | 250/286 |
| 6,818,889 | B1 | 11/2004 | Sheehan et al. | 250/288 |
| 6,822,225 | B2 | 11/2004 | Xu et al. | 250/287 |
| 6,852,969 | B2 | 2/2005 | Marcus et al. | 250/288 |
| 6,852,970 | B2 | 2/2005 | Yamada et al. | 250/288 |
| 6,867,415 | B2 | 3/2005 | Hughey et al. | 250/288 |
| 6,878,930 | B1 | 4/2005 | Willoughby et al. | 250/281 |
| 6,888,132 | B1 | 5/2005 | Sheehan et al. | 250/288 |
| 6,914,243 | B2 | 7/2005 | Sheehan et al. | 250/288 |
| 6,943,347 | B1 | 9/2005 | Willoughby et al. | 250/288 |
| 6,949,740 | B1 | 9/2005 | Sheehan et al. | 250/288 |
| 6,949,741 | B2 | 9/2005 | Cody et al. | 250/288 |
| 6,972,407 | B2 | 12/2005 | Miller et al. | 250/287 |
| 6,998,605 | B1 | 2/2006 | Frazer et al. | 250/281 |
| 7,005,634 | B2 | 2/2006 | Shiokawa et al. | 250/288 |
| 7,041,966 | B2 | 5/2006 | Frazer et al. | 250/281 |
| 7,053,367 | B2 | 5/2006 | Tobita et al. | 250/288 |
| 7,060,976 | B2 | 6/2006 | Sheehan et al. | 250/288 |
| 7,064,320 | B2 | 6/2006 | Yamada et al. | 250/288 |
| 7,078,068 | B2 | 7/2006 | Book | 426/140 |
| 7,083,112 | B2 | 8/2006 | Ivri | 239/4 |
| 7,087,898 | B2 | 8/2006 | Willoughby et al. | 250/288 |
| 7,091,493 | B2 | 8/2006 | Hiraoka | 250/425 |
| 7,095,019 | B1 * | 8/2006 | Sheehan et al. | 250/288 |
| 7,112,785 | B2 | 9/2006 | Laramee et al. | 250/288 |
| 7,112,786 | B2 | 9/2006 | Russ, IV et al. | 250/288 |
| 7,138,626 | B1 | 11/2006 | Karpetsky | 250/288 |
| 7,253,406 | B1 * | 8/2007 | Sheehan et al. | 250/288 |
| 7,259,368 | B2 | 8/2007 | Frazer et al. | 250/281 |
| 7,274,015 | B2 | 9/2007 | Miller et al. | 356/508 |
| 7,429,731 | B1 | 9/2008 | Karpetsky | 250/288 |
| 2002/0011560 | A1 | 1/2002 | Sheehan et al. | 250/283 |
| 2002/0175278 | A1 | 11/2002 | Whitehouse | 250/281 |
| 2002/0185593 | A1 | 12/2002 | Doring | 250/287 |
| 2002/0185595 | A1 | 12/2002 | Smith et al. | 250/288 |
| 2003/0034452 | A1 | 2/2003 | Fischer et al. | 250/288 |
| 2003/0038236 | A1 | 2/2003 | Russ, IV et al. | 250/288 |
| 2003/0197121 | A1 | 10/2003 | Turecek et al. | 250/281 |
| 2004/0161856 | A1 | 8/2004 | Handly | 436/177 |
| 2004/0245458 | A1 | 12/2004 | Sheehan et al. | 250/288 |
| 2005/0056775 | A1 | 3/2005 | Cody et al. | 250/281 |
| 2005/0196871 | A1 | 9/2005 | Cody et al. | 436/173 |
| 2006/0249671 | A1 | 11/2006 | Karpetsky | 250/288 |
| 2007/0084999 | A1 | 4/2007 | Miller et al. | 250/288 |
| 2007/0114389 | A1 | 5/2007 | Karpetsky et al. | 250/288 |
| 2008/0296493 | A1 | 12/2008 | Willoughby et al. | 250/288 |

FOREIGN PATENT DOCUMENTS

| | | | |
|---|---|---|---|
| GB | 2288061 | | 10/1995 |
| JP | 04215329 | | 8/1992 |
| JP | 05203637 | | 8/1993 |
| JP | 10088798 | | 4/1998 |
| WO | WO 93/14515 | | 7/1993 |
| WO | WO 98/07505 | | 2/1998 |
| WO | WO 99/63576 | | 12/1999 |
| WO | WO 00/08455 | | 2/2000 |
| WO | WO 00/08456 | | 2/2000 |
| WO | WO 00/08457 | | 2/2000 |
| WO | WO 01/33604 | A2 | 5/2001 |
| WO | WO 01/33605 | A3 | 5/2001 |
| WO | WO 03/010794 | | 2/2003 |
| WO | WO 04/098743 | | 11/2004 |

| | | |
|---|---|---|
| WO | WO 04/110583 | 12/2004 |
| WO | WO 06/011171 | 2/2006 |
| WO | WO 06/122121 | 11/2006 |
| WO | WO 08/054393 | 5/2008 |

OTHER PUBLICATIONS

Le, Hue P., "Progress and Trends in Ink-Jet Printing Technology" [online], *Journal of Imaging Science and Technology,* vol. 42, No. 1, Jan./Feb., 1998 [retrieved on May 15, 2008], pp, Retrieved from the Internet:http://www.imaging.org/resources/web_tutorials/inkjet.cfm.
Chemi-Ionization-Mass Spectrometry Terms, "Chemi-Ionization" [online], Dec. 26, 2005 [retrieved on Apr. 28, 2006], p., Retrieved from the Internet:http://www.msterms.com/wiki/index.pho?title=Chemi-Ionization.
Scott, R. P. W., "Gas Chromatography Detectors" [online], Part of the Chrom. Ed. Series, Subsection: Thermal Argon Detector, Copyright 2002-2005 [retrieved on Apr. 28, 2006], 7 pp., Retrieved from the Internet: http://www.chromatography-online.org/GC-Detectors/Thermal-Argon/rs61.html.
Scott, R. P. W., "Gas Chromatography Detectors" [online], Part of the Chrom. Ed. Series, Subsection: Macro Argon Detector, Copyright 2002-2005 [retrieved on Apr. 28, 2006 ], 10 pp., Retrieved from the Internet: http://www.chromatography-online.org/GC-Detectors/Ionization-Detectors/Macro-Argon/rs54.html.
Scott, R. P. W., "Gas Chromatography Detectors" [online], Part of the Chrom. Ed. Series, Subsection: Micro Argon Detector, Copyright 2002-2005 [retrieved on May 11, 2006], 6 pp., Retrieved from the Internet: http://www.chromatography-online.org/GC-Detectors/Ionization-Detectors/Micro-Argon/rs59.html.
Scott, R. P. W., Gas Chromatography Detectors [online], Part of the Chrom. Ed. Series, Subsection: The Helium Detector, Copyright 2002-2005 [retrieved on Apr. 28, 2006], 8 pp., Retrieved from the Internet: http://www.chromatography-online.org/GC-Detectors/Ionization-Detectors/Helium/rs/64.html.
Laroussi, M., and Lu, X., "Room-Temperature Atmospheric Pressure Plasma Plume for Biomedical Applications," *Applied Physics Letters* 87, 113902, Sep. 8, 2005.
Akishev, Yu, et al., "Negative Corona, Glow and Spark Discharges in Ambient Air and Transitions Between Them," *Plasma Sources Sci. Technol.,* vol. 14, pp. S18-S25 (2005).
Willoughby, Ross C., et al., "Transmission of Ions Through Conductance Pathways From Atmospheric Pressure," *Proceedings of the 52nd ASMS Conference on Mass Spectrometry and Allied Topics,* Nashville, Tennessee, 2 pp., May 23-27, 2004.
Sheehan, Edward W., et al., "Atmospheric Pressure Focusing," *Proceedings of the 52nd ASMS Conference on Mass Spectrometry and Allied Topics,* Nashville, Tennessee, 2 pp., May 23-27, 2004.
Bennocci, et al., "I-V Characteristics and Photocurrents of a He Corona Discharge Under Flow Conditions," *J. Phys. D: Appl. Phys.,* vol. 37, pp. 709-714 (2004).
Bokman, C. Fredrik, ".Analytical Aspects of Atmospheric Pressure Ionization in Mass Spectrometry," Acta Universitatis Upsaliensis, *Comprehensive Summaries of Uppsala Dissertations from the Faculty of Science and Technology,* vol. 748, 46 pp., 2002.
Willoughby, R., Sheehan E., Mitrovich, A., "A Global Views of LC/MS," Global View Publishing, pp. 64-65, 470-471, Copyright 2002.
Stach, J., et al., "Ion Mobility Spectrometry—Basic Elements and Applications," *International Journal for Ion Mobility Spectrometry,* IJIMS 5(2002)1, pp. 1-21, 2002.
Hanley, Luke, et al., "Surface Mass Spectrometry of Molecular Species," *Journal of Mass Spectrometry,* vol. 34, pp. 705-723 (1999).
Steinfield, Jeffrey I., et al., "Explosives Detection: A Challenge for Physical Chemistry," *Annual Review of Physical Chemistry,* vol. 49, pp. 203-232, Oct. 1998.
Niessen, W. M. A. and van der Greef, J., "Liquid Chromatography-Mass Spectrometry Principles and Applications," Marcel Dekker, Inc., New York, New York, pp. 339-341, Copyright 1992.
Hart, K. J., et al., "Reaction of Analyte Ions With Neutral Chemical Ionization Gas," *Journal of the American Society for Mass Spectrometry,* vol. 3, No. 5, pp. 549-557, 1992 (ISSN 1044-0305).
Bruins, A. P., "Mass Spectrometry With Ion Sources Operating at Amospheric Pressure," *Mass Spectrometry Reviews,* vol. 10, pp. 53-77, 1991.
Duckworth, D. C., et al., "Radio Frequency Powered Glow Discharge Atomization/Ionization Source for Solids Mass Spectrometry," *Analytical Chemistry,* vol. 61, No. 17, pp. 1879-1886, Sep. 1, 1989.
Beres, S. A., et al., "A New Type of Argon Ionisation Detector," *Analyst,* vol. 112, pp. 91-95, Jan. 1987.
Lovelock, J. E. and Lipsky, S. R., "Electron Affinity Spectroscopy—A New Method for the Identification of Functional Groups in Chemical Compounds Separated by Gas Chromatography," *J. Amer. Chem. Soc.,* vol. 82, pp. 431-433, Jan. 20, 1960.
Lovelock, J. E., "A Sensitivie Detector for Gas Chromatography," *Journal of Chromatography,* vol. 1, pp. 35-46, 1958.
Lovelock, J. E., "Measurement of Low Vapour Concentrations by Collision with Excited Rare Gas Atoms," *Nature,* vol. 181, pp. 1460-1462, 1958.
"Principles of DC and RF Plasma Spraying" [online], 1 p., Retrieved from the Internet:http://wiv.vdi/bezirksverein.de/HenneVDI.pdf.
Leparoux, et al., "Investigation of Non-Oxide Nanoparticles by RF Induction Plasma Processing—Synthesis, Modelling and In-Situ Monitoring," *EMPA-Thun, Material Technology,* 1 p.
Guimbaud, C., et al., "An APCI Ion Source to Monitor $HNO_3$ Under Ambient Air Conditions" [online], 1 p., Retrieved from the Internet: http://Ich.web.psi.ch/pdf/anrepo3/19.pdf.
Lin, B., Sunner, J., "Ion Transport by Viscous Gas Flow Through Capillaries," *J. Am. Soc. Mass. Spectrom.* 5, pp. 873-885 (1994).
Potjewyd, J., "Focusing of Ions in Atmospheric Pressure Gases Using Electrostatic Fields," Ph.D. Thesis, University of Toronto (1983).
Mahoney, J. F., et al., "A Theoretical and Experimental Basis for Producing Very High Mass Biomolecular Ions by Electrohydrodynamic Emission," 22nd *IEEE Industry Applications Society Annual Meeting,* Atlanta, Georgia, Oct. 18-23, 1987.
Olivares, J. A., et al., "On-Line Mass Spectrometric Detection for Capillary Zone Electrophoresis," *Anal. Chem.* 59, pp. 1230-1232 (1987).
Lee, T. D., et al., "An EHD Sources for the Mass Spectral Analysis of Peptides," *Proceedings of the 36th ASMA Conference on Mass Spectrometry and Allied Topics,* San Francisco, California, Jun. 5-10, 1988.
Smith, R. D., et al., "Capillary Zone Electrophoresis-Mass Spectrometry Using an Electrospray Ionization Interface," *Anal. Chem.* 60, pp. 436-441 (1988).
Lee, T. D., et al. "Electrohydrodynamic Emission Mass Spectra of Peptides," *Proceedings of the 37th ASMS Conference on Mass Spectrometry and Allied Topics,* Miami Beach, Florida, May 21-26, 1989.
Mahoney, J.F., et al., "Electrohydrodynamic Ion Source Design for Mass Spectrometry: Ionization, Ion Optics and Desolvation," *Proceedings of the 38th ASMS Conference on Mass Spectrometry and Allied Topics,* Tucson, Arizona, Jun. 3-8, 1990.
Feng, X., et al., "Single Isolated Droplets with Net Charge as a Source of Ions," *J. Am. Soc. Mass Spectrom,* 11, pp. 393-399 (2000).
Schneider, B. B., et al., "An Atmospheric Pressure Ion Lens to Improve Electrospray Ionization at Low Solution Flow-Rates," *Rapid Commun. Mass Spectrum* 15, pp. 2168-2175 (2001).
Alousi, A., et al., "Improved Transport of Atmospheric Pressure Ions Into a Mass Spectrometer," *The Proceedings of the 50th ASMS Conference on Mass Spectrometry and Allied Topics,* Orlando Florida, Jun. 2-6, 2002.
Klesper, H., et al., "Intensity Increase in ESI MS by Means of Focusing the Spray Cloud onto the MS Orifice," *The Proceedings of the 50th ASMS Conference on Mass Spectrometry and Allied Topics,* Orlando, Florida, Jun. 2-6 2002.
Schneider, B. B., et al., "An Atmospheric Pressure Ion Lens that Improves Nebulizer Assisted Electrospray Ion Sources," *J. Am. Soc. Mass Spectrom.* 13, pp. 906-913 (2002).
Hartley, F. T., et al., "NBC Detection in Air and Water," *Micro/Nano* 8, pp. 1, 2, and 8 (Dec., 2003).
Cody, R. B., et al., "Versatile New Ion Source for the Analysis of Materials in Open Air Under Ambient Conditions," *Anal. Chem.* 77, pp. 2297-2302 (2005).

McEwen, C. N., et al., "Analysis of Solids, Liquids, and Biological Tissues Using Solids Probe Introduction at Atmospheric Pressure . . . ," *Anal. Chem.* 77, pp. 7826-7831 (2005).

Cody, et al., "DART™: Direct Analysis in Real Time for Drugs, Explosives, Chemical Agents, and More . . . ," Sanibel Conference (American Society for Mass Spectrometry Sanibel Conference on Mass Spectrometry in Forensic Science and Counter-Terrorism), Clearwater, Florida, 39 pp., Jan. 28-Feb. 1, 2004.

Application as Filed for U.S. Appl. No. 11/455,334, filed Jun. 19, 2006, 10 pp.

Application as Filed for U.S. Appl. No. 11/987,632, filed Dec. 3, 2007, 46 pp.

Application as Filed for U.S. Appl. No. 12/153,358, filed May 16, 2008, 46 pp.

Application as Filed for U.S. Appl. No. 11/594,401, filed Nov. 8, 2006, 23 pp.

Application as Filed for U.S. Appl. No. 12/200,941, filed Aug. 29, 2008, 21 pp.

Application as Filed for U.S. Appl. No. 12/344,872, filed Dec. 29, 2008, 39 pp.

* cited by examiner

REMOTE REAGENT ION GENERATOR

REFERENCE TO RELATED APPLICATIONS

This application claims the benefit of U.S. Provisional Patent Application No. 60/724,399 that was filed on Oct. 7, 2005.

This patent also relates to the following commonly owned patents and patent applications: U.S. Pat. No. 6,888,132, granted May 3, 2005 and continuation Ser. No. 11/120,363, filed May 2, 2005 now U.S. Pat. No. 7,095,019. This application is also related to application Ser. No. 08/946,290, filed Oct. 7, 1997, now U.S. Pat. No. 6,147,345, granted Nov. 14, 2000; application Ser. No. 09/877,167, filed Jun. 8, 2001, now U.S. Pat. No. 6,744,041, granted Jun. 1, 2004; application Ser. No. 10/449,147, filed May 31, 2003, now U.S. Pat. No. 6,818, 889, granted Nov. 16, 2004; application Ser. No. 10/785,441, filed Feb. 23, 2004, now U.S. Pat. No. 6,878,930, granted Apr. 12, 2005; application Ser. No. 10/661,842, filed Sep. 12, 2003, application Ser. No. 10/688,021, filed Oct. 17, 2003, application Ser. No. 10/863,130, filed Jun. 7, 2004, now patent application publication No. 2004/0245458, published Dec. 9, 2004; application Ser. No. 10/862,304, filed Jun. 7, 2004, now patent application publication No. 2005/0056776, published Mar. 27, 2005 and application Ser. No. 11/122,459, notice of allowance: Jul. 14, 2006.

BACKGROUND OF THE INVENTION

1. Technical Field

This invention relates to methods and devices for improved ionization, collection, focusing and transmission of ions, generated at or near atmospheric pressure, of gaseous analytes or analytes on surfaces for introduction into a mass spectrometer and other gas-phase ion analyzers and detectors.

2. Description of Related Art

The generation of ions at or near atmospheric pressure is accomplished using a variety of means, including, electrospray (ES), atmospheric pressure chemical ionization (APCI), atmospheric pressure matrix assisted laser desorption ionization (AP-MALDI), discharge ionization, $^{63}$Ni sources, inductively coupled plasma ionization, and photoionization. A general characteristic of these atmospheric or near atmospheric ionization sources is the dispersive nature of the ions once produced. Needle sources such as electrospray and APCI disperse ions radially from the axis in the high electric fields emanating from needle tips. Aerosol techniques disperse ions in the radial flow of fluid emanating from tubes and nebulizers. Even desorption techniques such as atmospheric pressure MALDI will disperse ions in a solid angle from a surface. The radial cross-section of many dispersive sources can be as large as 5 or 10 centimeters in diameter.

As a consequence of a wide variety of dispersive processes, efficient sampling of ions from atmospheric pressure sources to small cross-sectional targets or through small cross-sectional apertures and tubes (usually less than 1 mm) into a mass spectrometer (MS) or other sensor capable of detecting and identifying ions becomes quite problematic. This problem becomes amplified if the source of ions is removed from the regions directly adjacent to the aperture. Consequently, there is a tremendous loss of ions prior to entry into the sensor for detection and identification, as shown by the following examples.

The simplest approach to sampling dispersive atmospheric sources is to position the source on axis with a sampling aperture or tube. The sampling efficiency of simple plate apertures is generally less than 1 ion in $10^4$. U.S. Pat. No. 4,209,696 (1980) to Fite discloses an electrospray source with a pinhole aperture, while U.S. Pat. No. 5,965,884 (1999) and World patent 99/63576 (1999) both to Laiko et al. discloses an atmospheric pressure MALDI source configured with a pinhole or aperture in a plate. An atmospheric pressure source disclosed in Japanese patent 04215329 (1994) by Kazuaki et al. is also representative of this approach. In general, these methods are severely restricted by the need for precise aperture alignment and source positioning, and characterized by very poor sampling efficiencies.

U.S. Pat. No. 6,534,765 (2003) and World patent 01/33605 (1999) both to Robb et al. discloses a low field photoionization source developed for liquid chromatography-mass spectrometry (LC/MS) applications. The use of this low field photo-ionization source has lead to some improvement in sampling efficiency from atmospheric pressure sources, but these sources also suffer from a lower concentration of reagent ions when compared to traditional APCI sources.

A wide variety of ion source configurations utilize conical skimmer apertures in order to improve collection efficiency over planar devices. This approach to focusing ions from atmospheric sources is limited by the acceptance angle of the electrostatic fields generated at the cone. Generally, source position relative to the cone is also critical to performance, although somewhat better than planar apertures. Conical apertures are the primary inlet geometry for commercial inductively coupled plasma (ICP/MS) with closely coupled and axially aligned torches. Examples of conical-shaped apertures are prevalent in ES and APCI (U.S. Pat. No. 5,756, 994), and ICP (U.S. Pat. No. 4,999,492) inlets. As with planar apertures, source positioning relative to the aperture is critical to performance and collection efficiency is quite low.

Another focusing alternative utilizes a plate lens with a large hole in front of an aperture plate or tube for transferring sample into the vacuum system. The aperture plate is generally held at a high potential difference relative to the plate lens. This approach is referred to as the "Plate-Well" design which is disclosed, with apertures, in U.S. Pat. Nos. 4,531, 056 (1985) to Labowsky et al., 5,412,209 (1995) to Covey et al., and 5,747,799 (1998) to Franzen; and with tubes as disclosed in U.S. Pat. Nos. 4,542,293 (1985) to Fenn et al., 5,559,326 (1996) to Goodley et al., and 6,060,705 (2000) to Whitehouse et al.

This configuration creates a potential well that penetrates into the source region and shows a significant improvement in collection efficiency relative to plate or cone apertures. But it has a clear disadvantage in that the potential well resulting from the field penetration is not independent of ion source position, or potential. Furthermore, high voltage needles can diminish this well and off-axis sources can affect the shape and collection efficiency of the well. Optimal positions are highly dependent upon flow (liquid and, concurrent and counter-current gas flows) and voltages. This type of design is reasonably well suited for small volume sources such as nanospray while larger flow sources are less efficient. Because this geometry is generally preferred over plates and cones, it is seen in most types of atmospheric source designs. Several embodiments of atmospheric pressure sources have incorporated grids in order to control the sampling of gas-phase ions. U.S. Pat. No. 5,436,446 (1995) to Jarrell et al. utilized a grid that reflected lower mass ions into a collection cone and passed large particles through the grid. This modulated system was intended to allow grounded needles and collection cones or apertures, while the grid would float at high alternating potentials. This device had limitations with the duty cycle of ion collection in a modulating field (noncontinuous sample introduction) and spatial and positioning restrictions relative to the sampling aperture. U.S. Pat. No. 6,207,954 (2001) to Andrien et al. used grids as counter electrodes for multiple corona discharge sources configured in geometries and at potentials to generate ions of opposite charge and monitor their interactions and reactions. This specialized reaction source was not configured with high field ratios across the grids and was not intended for high transmission and collection, rather for generation of very specific reactant ions. An alternative atmospheric pressure device disclosed in Japanese patent 10088798 (1999) to Yoshiaki utilized on-axis hemispherical grids in the second stage of pressure reduction. Although the approach is similar to the present device in concept, it is severely limited by gas discharge that may occur at these low pressures if higher voltages are applied to the electrodes and the fact that most of the ions (>99%) formed at atmospheric pressure are lost at the cone-aperture from the movement from atmospheric pressure into the first pumping stage.

A presentation by Cody et al. entitled "DART™: Direct Analysis in Real Time for Drugs, Explosives, Chemical Agents and More . . . " made in 2004 (American Society for Mass Spectrometry Sanibel Conference on Mass Spectrometry in Forensic Science and Counter-terrorism, Clearwater, Fla., Jan. 28-Feb. 1, 2004) and U.S. patent publication 2005/0056775 (2005), U.S. Pat. No. 6,949,741 and foreign patent application WO 04/098743 to Cody et al. has disclosed an ionization source and detection technique that incorporates a gas-discharge atmospheric ionization source configured as a tube or gun with a grided aperture or opening at the exit of the tube leading into a low-field reaction region upstream of the sampling aperture of a mass spectrometer for the purpose of ionizing gas-phase molecules through the means of atmospheric pressure ionization.

Grids are also commonly utilized for sampling ions from atmospheric ion sources utilized in ion mobility spectrometry (IMS). Generally, for IMS analysis, ions are pulsed through grids down a drift tube to a detector as shown in U.S. Pat. No. 6,239,428 (2001) to Kunz. Great effort is made to create a planar plug of ions in order to maximize resolution of components in the mobility spectrum. These devices generally are not continuous, nor are they operated such that ions are focused into apertures or capillaries at the atmospheric-vacuum interface of mass analyzers.

The conclusion is that a highly efficient sample or analyte ionization source is needed that allows collection and transmission of most sample ions to the inlet of mass spectrometers, ion mobility spectrometers or other sensors. Such a source, lacking positional dependence is presented herein.

SUMMARY OF THE INVENTION

A preferred embodiment of the invention is the configuration of an atmospheric pressure remote reagent chemical ionization source (R2CIS), coupled with a field-free transfer region leading to a reaction region to facilitate efficient sample ionization and collection. The novelty of this device is the manner of isolation of the electric fields in the reagent ion generation region from the electric fields of the reaction or sample ionization region and those in the product ion-sampling region. This is accomplished through the utilization of laminated lenses populated with a plurality of openings that efficiently pass ions from one region to another without significant penetration of the electric fields from the adjacent regions. Another novel feature is the electronic control of the R2CIS, enabling production of different reagent ion types and quantities by simple adjustment. An alternative embodiment of this invention is the configuration of a remote ionization source with a low-field reaction region and sampling capillary configured as a portable or benchtop chemical detector.

Hence, one object of the present invention is to increase the collection efficiency of ions and/or charged particles at a collector, or through an aperture or tube into a vacuum system. This is accomplished by creating a very small cross-sectional area beam of ions and/or charged particles from highly dispersed atmospheric pressure ion sources. The present invention has a significant advantage over prior art in that it demonstrates that the counter electrodes for APCI needles do not have to be the plate lens as practiced with most conventional sources. Instead, a High Transmission Element (HTE) separates the reagent ion generation region from the sample ion formation region and provides the needed ion focusing. The HTE can be of laminated construction, and is termed L-HTE and is used for illustrative purposes. This allows precise shaping of fields in both regions, thereby permitting high transmission efficiencies of reagent ions and significant compression of the sample ion stream. The aerosol and plasma can be generated remotely and ions can be allowed to drift toward the L-HTE with a substantial portion of the ions passing through the L-HTE into low-field or field-free regions at atmospheric or lower pressures. Ions can be generated in large ion source regions without losses to walls. Droplets have longer times to evaporate and/or desorb neutrals or ions without loss from the sampling stream. Source temperatures can be lower because rapid evaporation is not required, thereby limiting thermal decomposition of labile compounds.

Another object of the present invention is to have sample ion collection efficiency be independent of reagent ion source position. With the present invention there is no need for precise mechanical needle alignment or positioning relative to collectors, apertures, or tubes. Ions generated at any position in the reaction and sample ion-sampling regions are transmitted to the collector, aperture, or tube with similar efficiency. No existing technology has such positional and potential independence of the source. The precise and constant geometry, and alignment of the focusing well with sampling apertures will not change with needle placement. The electrostatic fields inside the reaction, sample ion-sampling, and deep-well regions (focusing side) will not change, even if the fields generated by the R2CIS are varied.

Another object of the present invention is to allow independence of the source type, thus allowing the device to transmit and collect ions from any atmospheric (or near atmospheric) pressure ionization source, including atmospheric pressure chemical ionization, inductively coupled plasma discharge sources, $Ni^{63}$ sources, spray ionization sources, induction ionization sources and photoionization sources.

Another object of this invention is to provide a device that can sample ions of a single polarity with extremely high efficiency.

Another object of the present invention is to electronically control the gas discharge in the R2CIS such that positive, negative or a mixture of positive and negative reagent ions is formed continuously.

Another object of the present invention is to efficiently collect and/or divert a flow of ions from more than one source by simultaneously introducing mass calibrants from a separate source and analytes from a different source at a different potential.

Another object of the present invention is to efficiently transmit ions to a plurality of target positions, thus allowing part of the sample to be collected on a surface while another part of the sample is being introduced through an aperture into a mass spectrometer or other analytical device to be analyzed.

Another object of the present invention is to improve the efficiency of multiplexed inlets from both multiple macroscopic sources and microchip arrays, particularly those developed with multiple needle arrays for APCI. The positional independence of this invention makes it compatible with a wide variety of needle array technologies.

Another object of this invention is to remove larger droplets and particles from aerosol sources using a counter-flow of gas to prevent contamination of deep-well lenses, funnel aperture walls, apertures, inlets to tubes, vacuum components, and the like.

A major advantage of the present device is its capability to efficiently deliver reagent ions to samples, which may be gases, liquids, solutions, particulates, or solids.

Another advantage of the present invention is its capability to generate a large excess of reagent ions in a remote region and to then introduce a high percentage of these reagent ions into the reaction region to drive the equilibrium of the reaction between reagent ions and sample far toward completion.

Another advantage of the present invention is the lack of limitations to the reaction volume. The reaction volume may literally be hundreds of $cm^3$ and the sampling losses associated with conventional sources will not be experienced because of the highly efficient use of electric fields to collect and move ions.

Another advantage of this ion source is the capability for neutrals and reagent ions to reside in the reaction region, in the presence of low electrostatic fields, for relatively long durations, even in a large volume, thus allowing reactions with very slow reaction kinetics to proceed well towards completion.

Another advantage of the present device is its capability to utilize the tremendous compression capabilities of funnel-well optics to compress substantially all of the ions generated in the reaction and funnel regions into a small cross-sectional area.

Another advantage of the present invention is its capability to heat a sample on a surface by means of radiant heat from a light source, such as an infrared light, or a laser, inducing volatilization the sample, forming gas-phase molecules, and then reacting these gas-phase molecules with reagent ions to form gas-phase sample ions which are then delivered into a gas-phase ion analyzer, such as a mass spectrometer or ion mobility analyzer.

Another advantage of the present invention is its capability to deposit reagent ions on a surface thereby charging-up sample chemical species on the surface and thereafter using the electric potentials of the device to collect those charged sample ions into a low-field region, and to subsequently move those gas-phase sample ions into a gas-phase ion analyzer through an aperture or capillary tube while controlling the various operations by use of a computer to thereby optimize the timing of each event, and synchronizing all events.

One of the most important advantages of the R2CIS when compared to conventional APCI sources is its relative lack of recombination losses in the reaction region.

BRIEF DESCRIPTION OF THE DRAWING FIGURES

Figure 7:
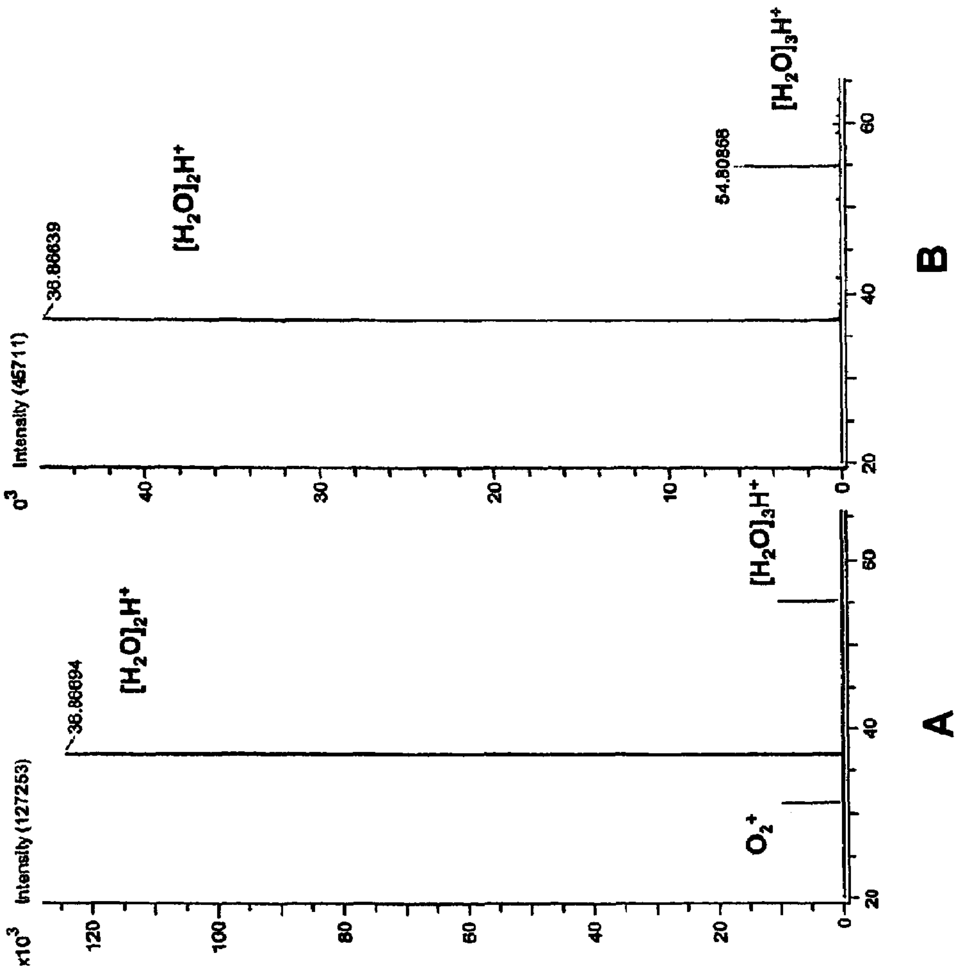

FIG. 7 is a graphical depiction of the different amounts of ions and types of ions that are produced by electronically controlling the gas discharge. A. More voltage above ground on anode. B. Less voltage above ground on anode.

Figure 4:
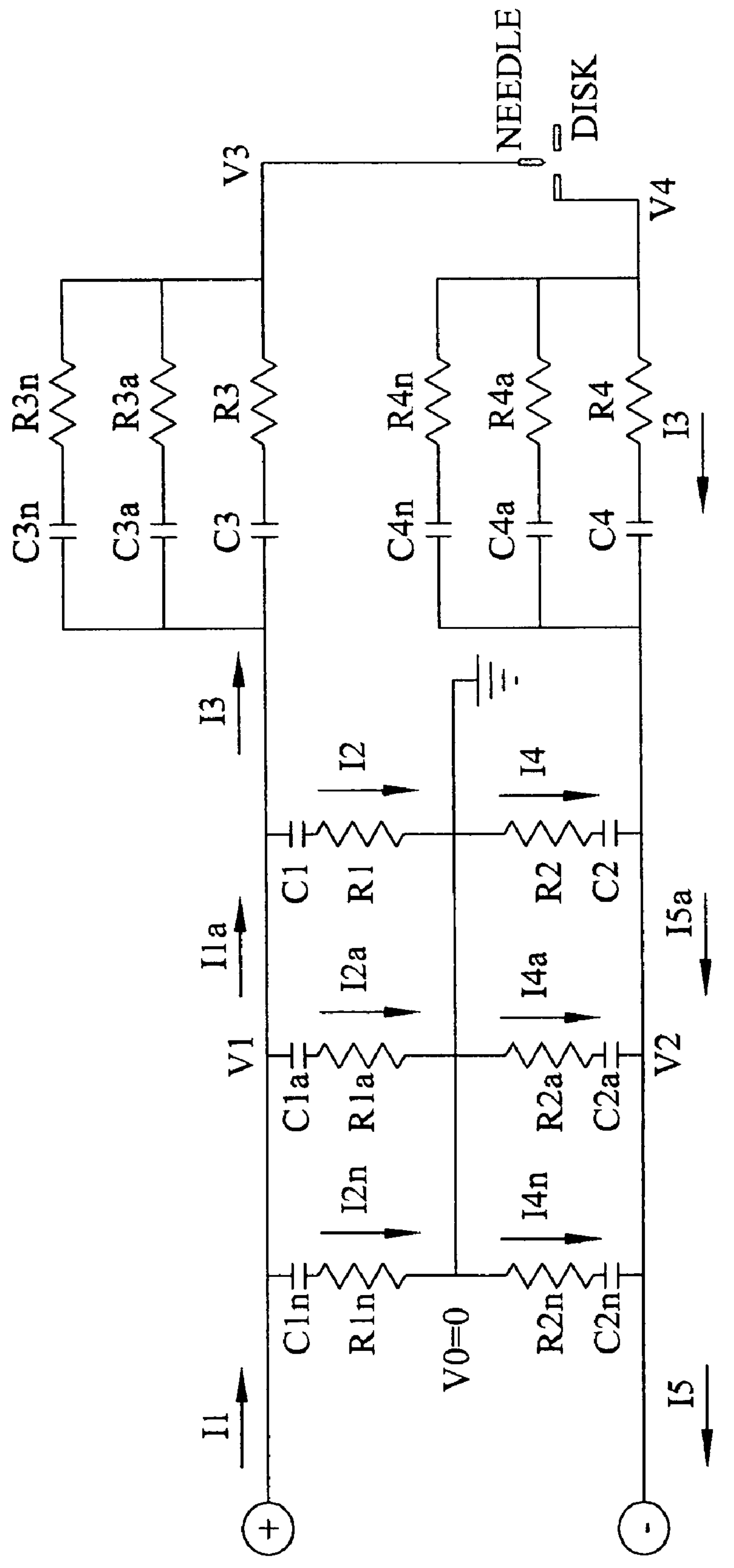
FIG. 4 depicts a circuit to control gas discharge and reagent ion production (needle attached to anode)
Figure 8:
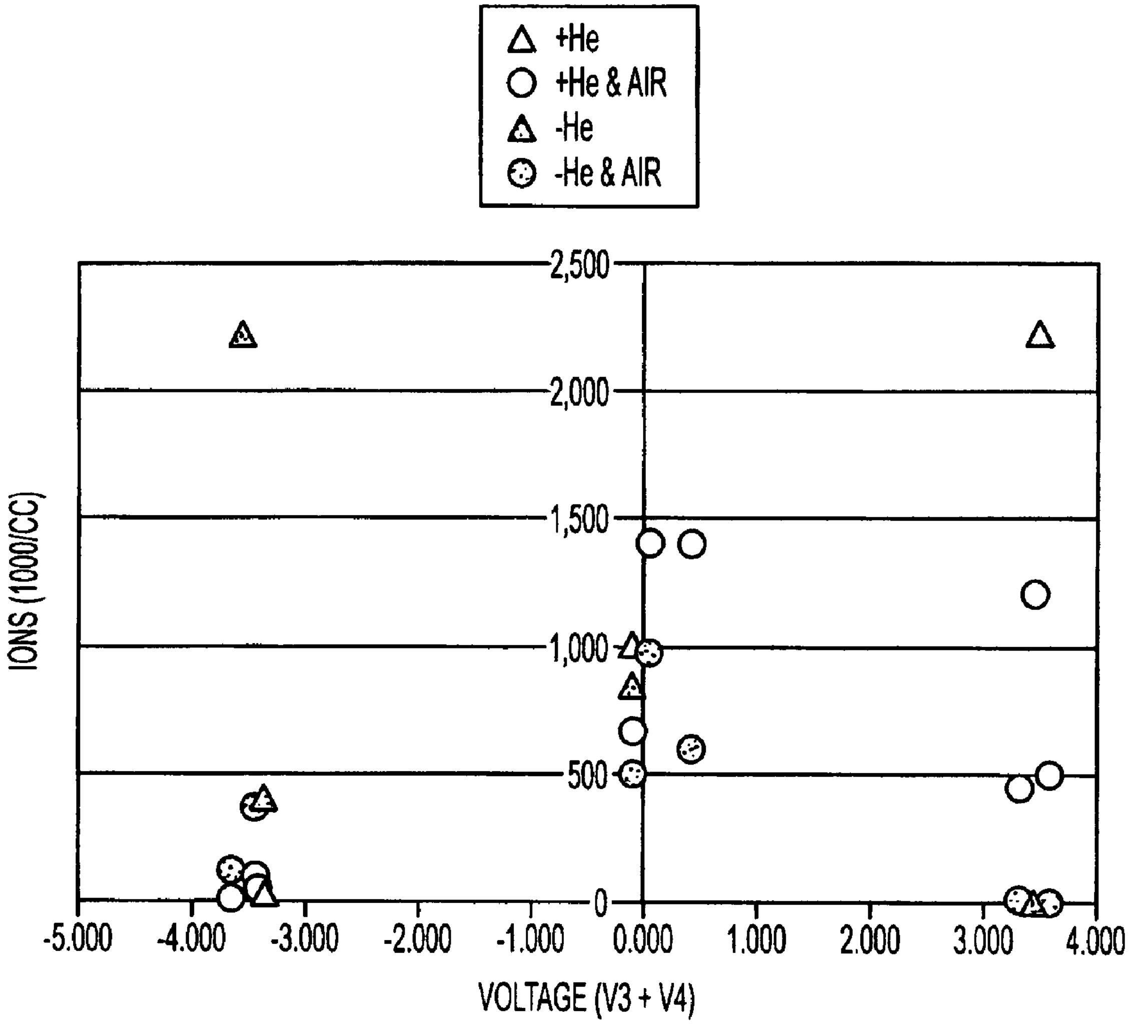
Figure 9:
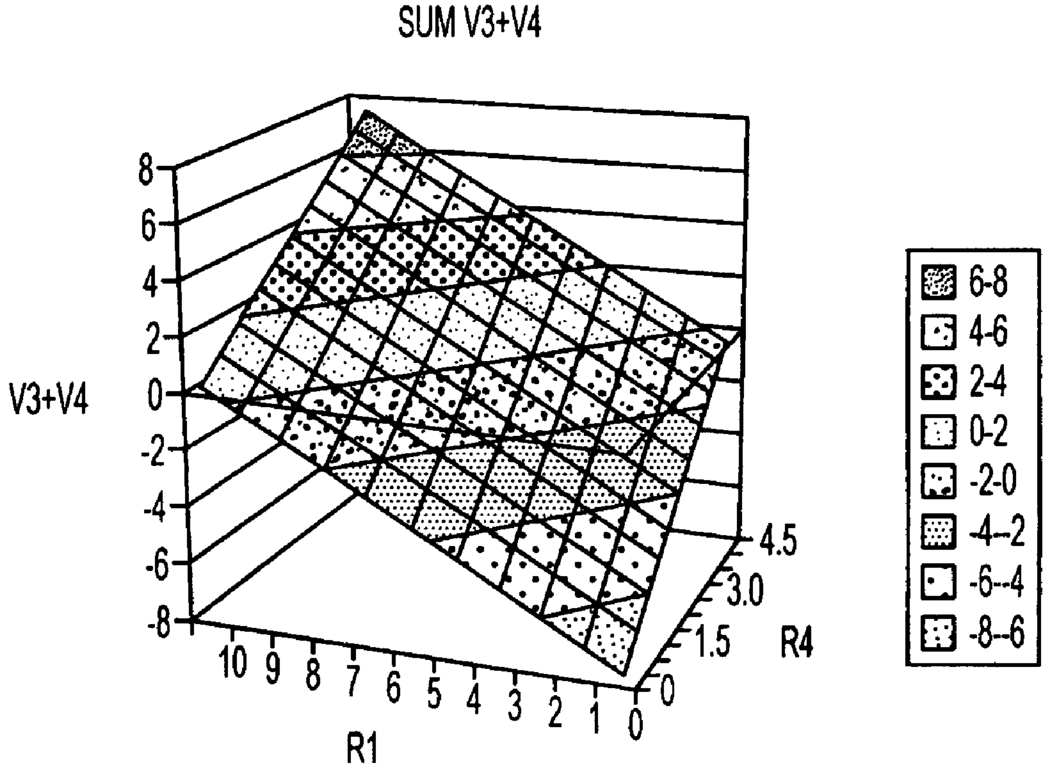
Figure 10A:
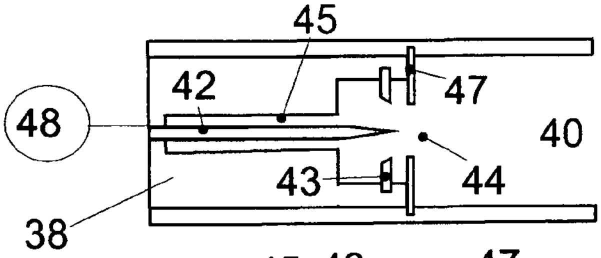
Figure 10B:
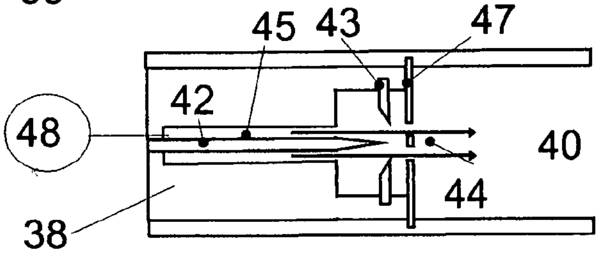
Figure 10C:
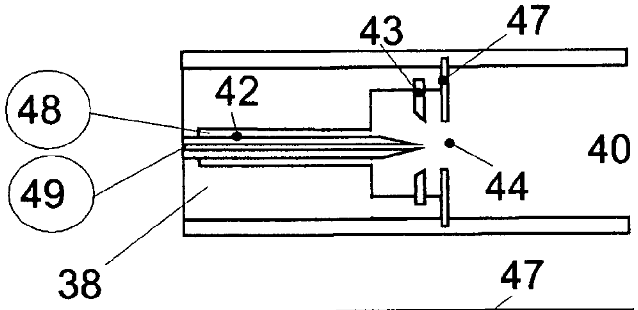
Figure 10D:
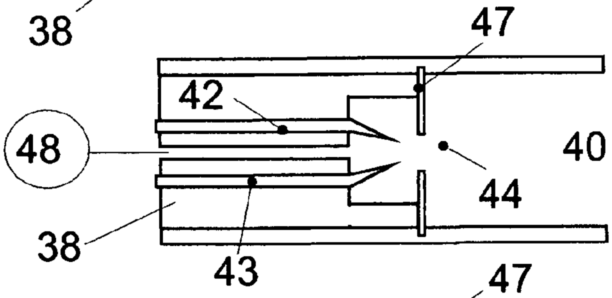
Figure 10E:
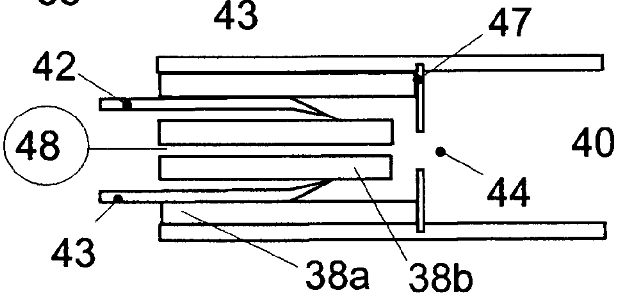
Figure 10F:
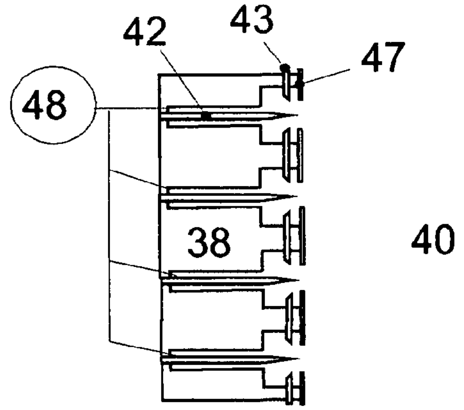
Figure 11A:
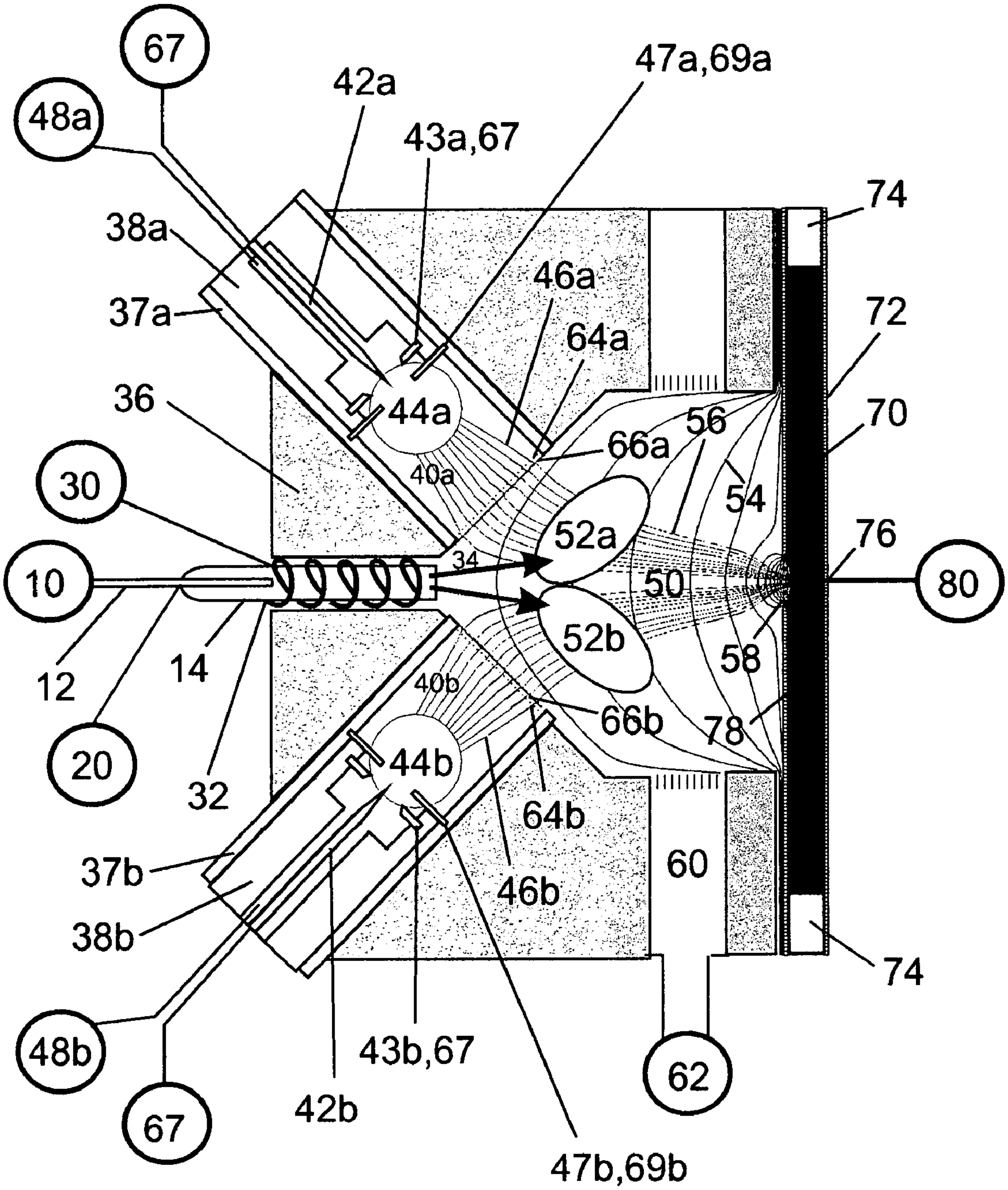
Figure 11B:
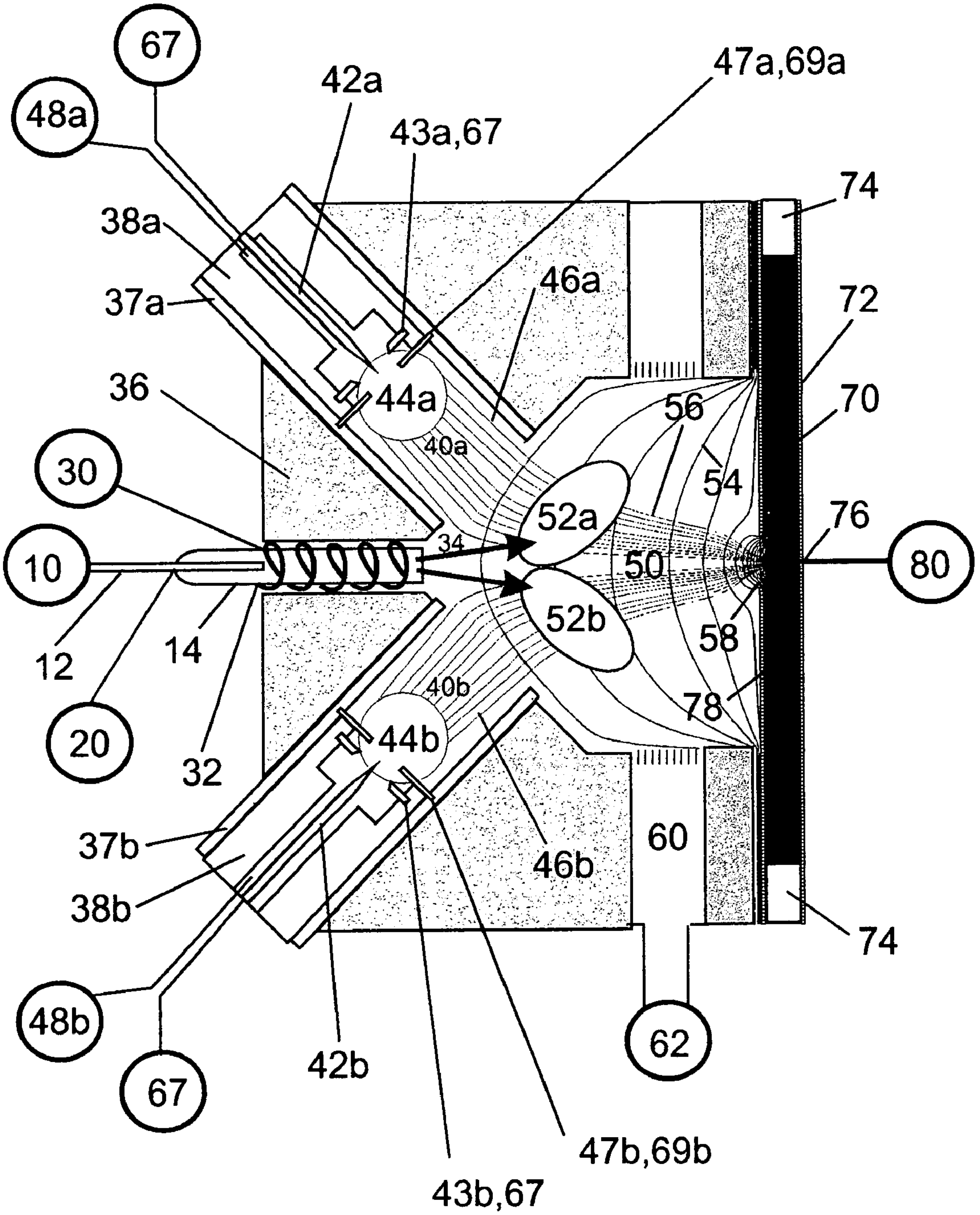
Figure 12:
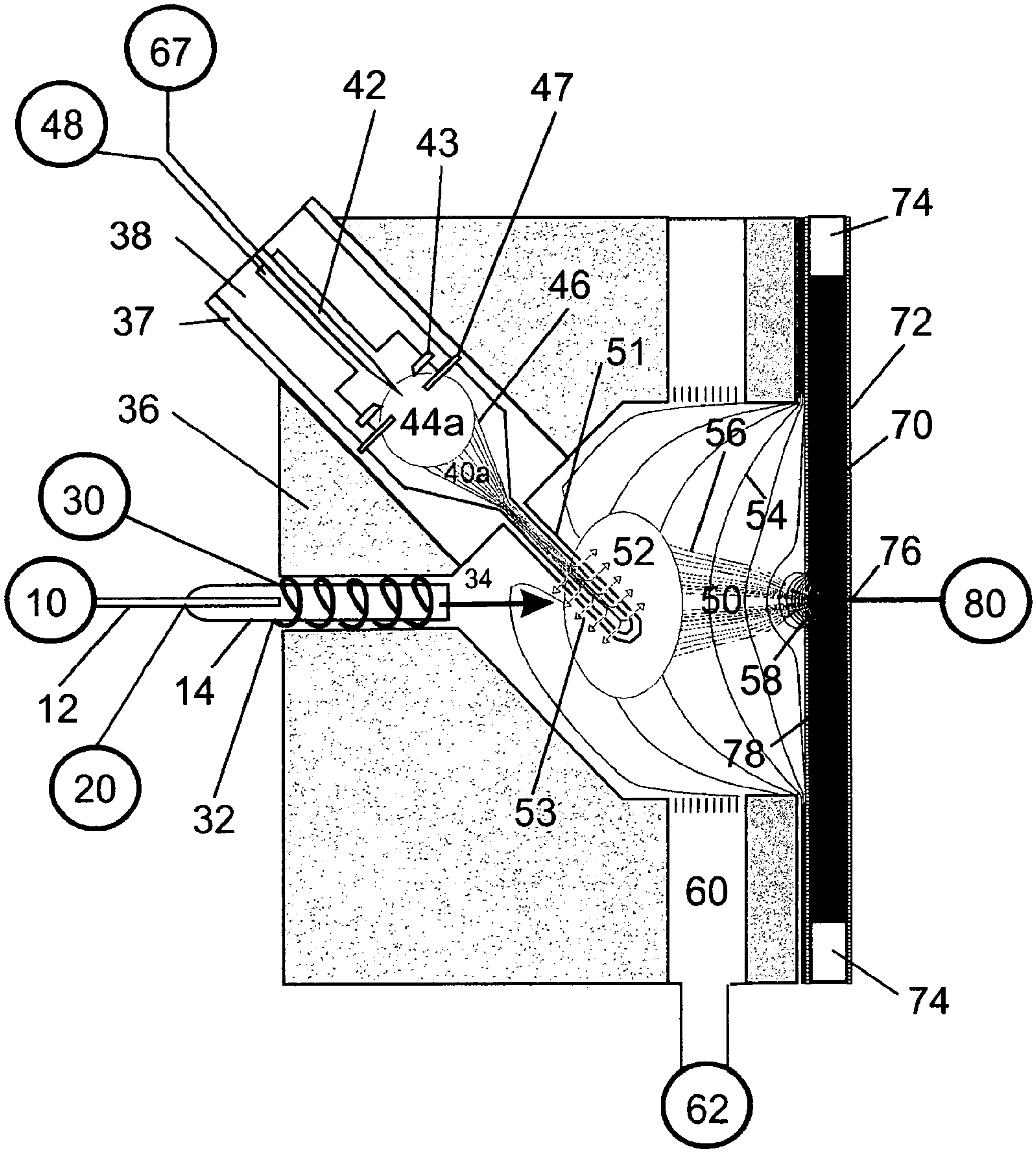
Figure 13:
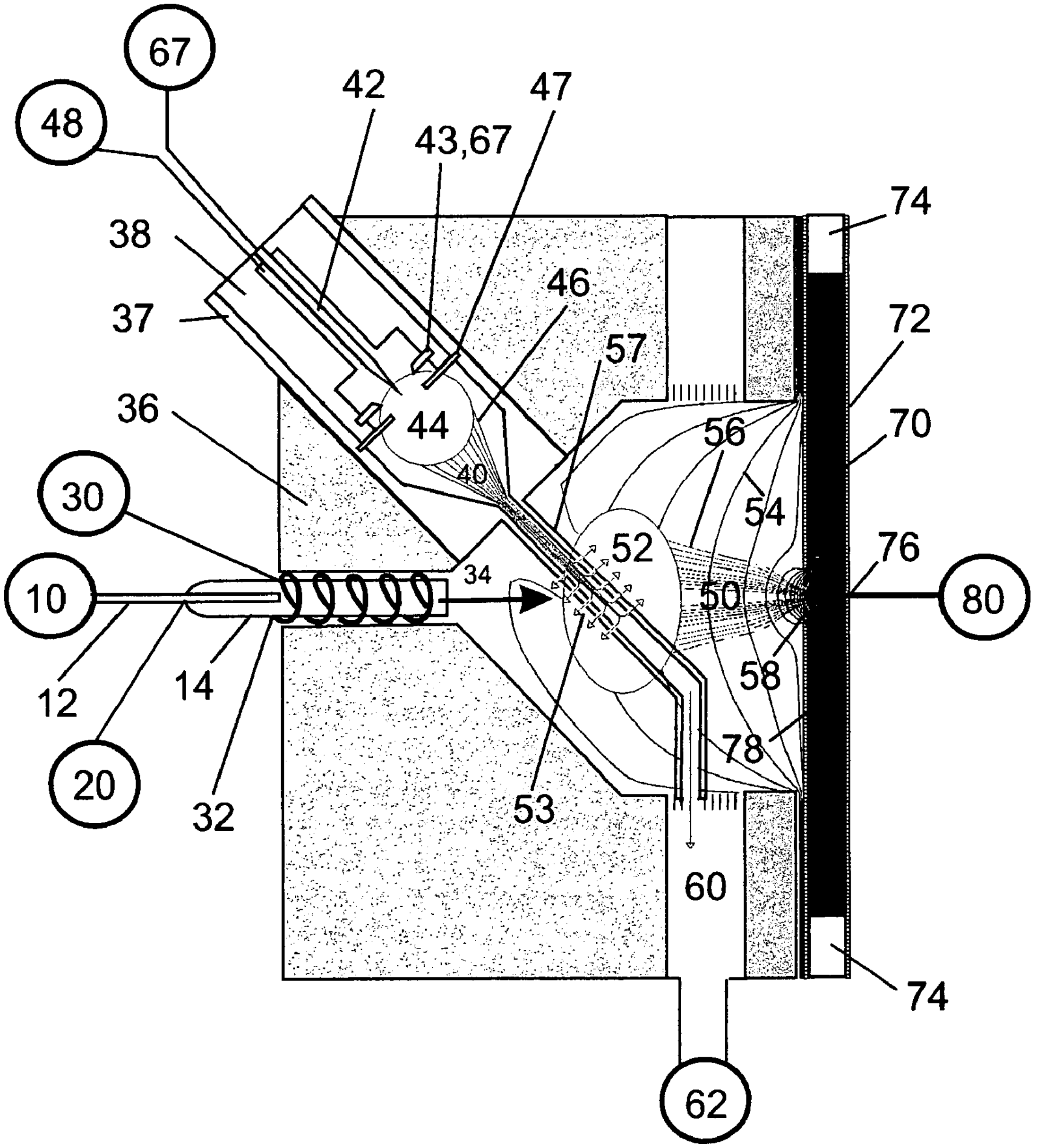
Figure 14:
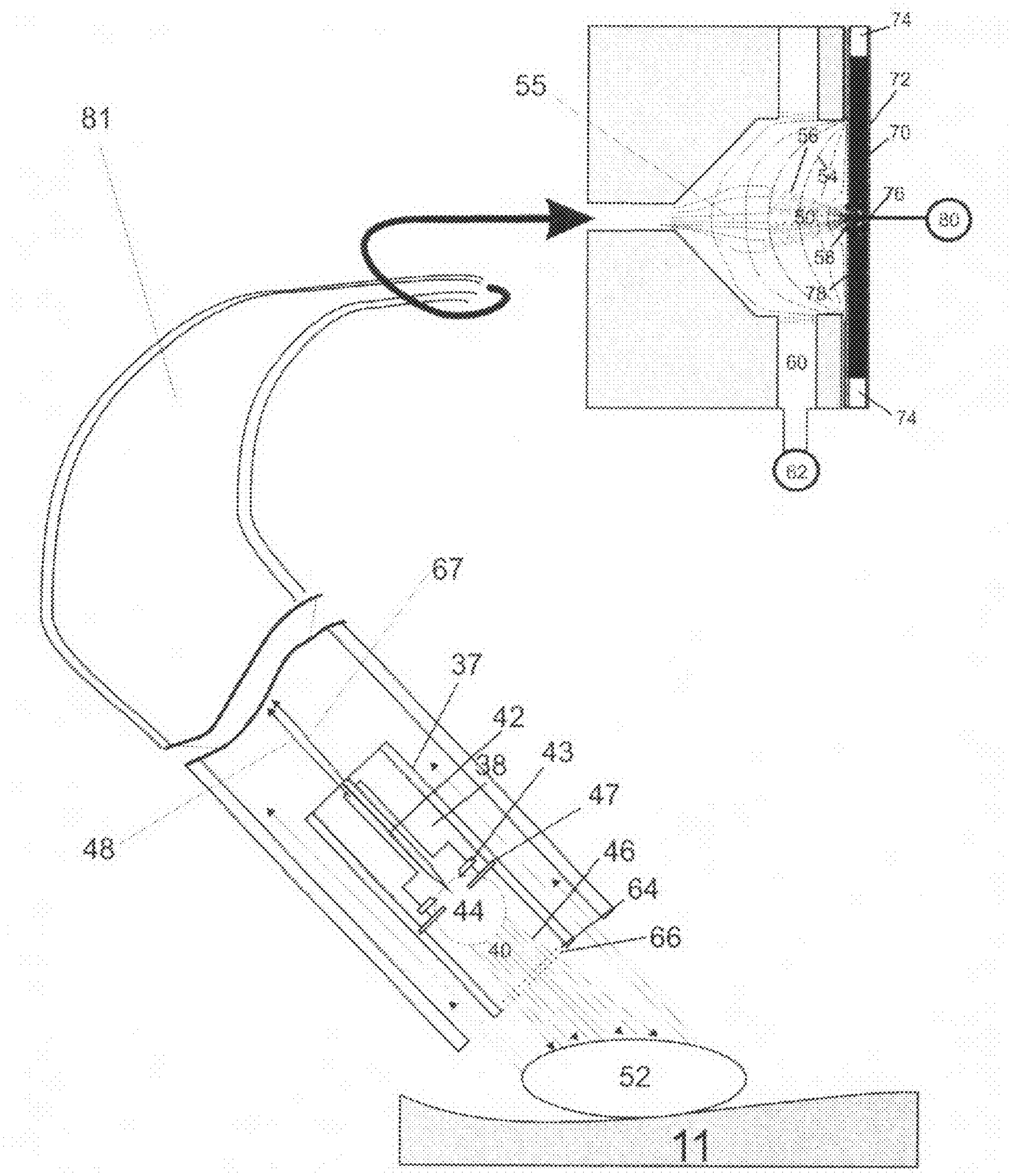
Figure 15:
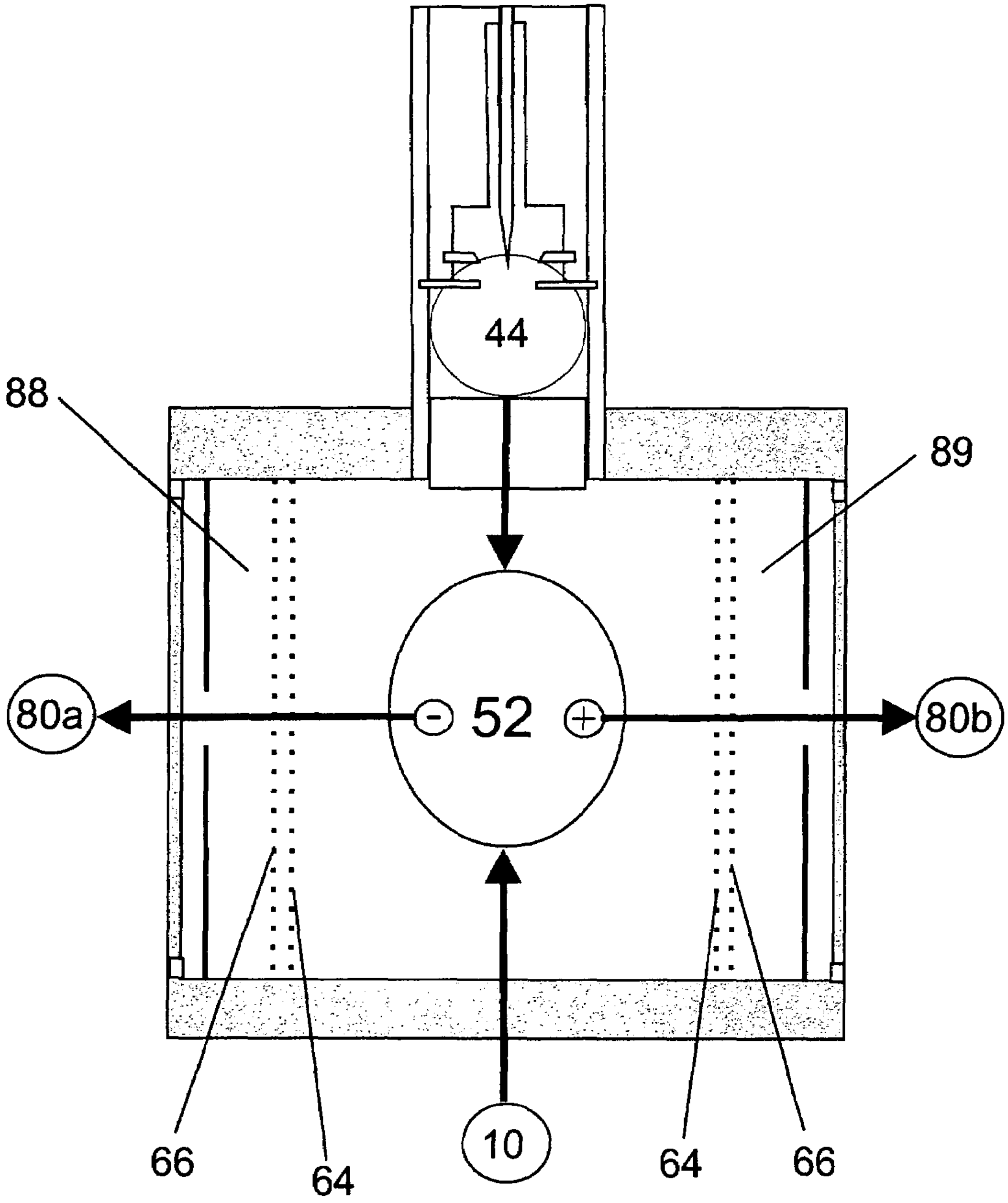
Figure 16:
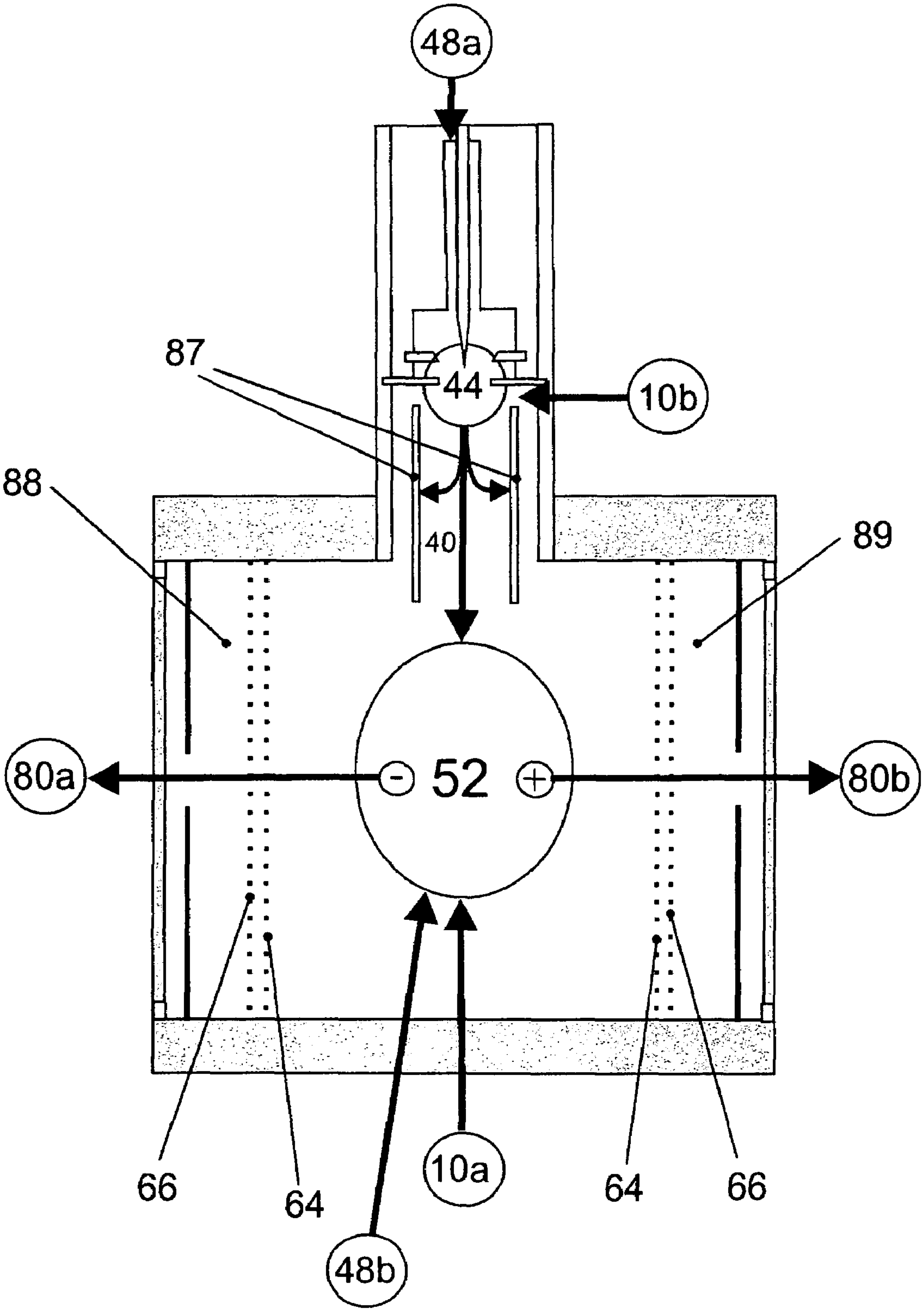

FIG. 8 depicts the changes in the production of positive and negative reagent ions that is obtained by varying resistances R3 and R4 in the circuit of FIG. 4;

FIG. 9. is a spatial representation of positive and negative ion production obtained by varying resistances R1 and R4 in the circuit of FIG. 4 by creating variations in the sum of V3 and V4;

FIGS. 10*a* to 10*f* are cross-sectional illustrations of a number of alternative embodiments of R2CISs for the generation of reagent ions and the field-free transfer of ions in which:

FIG. 10*a* shows an axial needle electrode and a disk-shaped counter-electrode with a disk-shaped field-shielding element downstream from the discharge region and held at a potential between the needle and counter electrodes to create a field-free transfer region downstream from the discharge region;

FIG. 10*b* shows an axial needle electrode and a disk-shaped counter-electrode with a disk-shaped field-shielding element downstream with an annular opening held at a potential between the needle and counter electrodes to create a field-free transfer region downstream from the discharge region;

FIG. 10*c* shows an axial hollow needle electrode and a disk-shaped counter-electrode with a disk-shaped field-shielding element downstream with an annular opening held at a potential between the needle and counter electrodes to create a field-free transfer region downstream from the discharge region;

FIG. 10*d* shows two off-axis discharge electrodes with a disk-shaped field-shielding element downstream held at a potential between the two discharge electrodes to create a field-free transfer region downstream from the discharge region FIG. 10*e* shows two off-axis discharge electrodes positioned outside of an insulated transfer tube with a disk-shaped field-shielding element downstream held at a potential between the two discharge electrodes to create a field-free transfer region downstream from the discharge region FIG. 10*f* shows multiple R2CISs oriented in a coplanar array;

FIG. 11A is a cross-sectional illustration of multiple R2CIS sources for API with laminated high transmission elements (L-HTE) separating the field-free transfer regions from a central sample reaction region;

FIG. 11B is a cross-sectional illustration of multiple R2CISs for API with an open tube;

FIG. 12 is a cross-sectional illustration of a single R2CIS for API with a perforated closed end tube that separates the field-free transfer region from a central sample reaction region:

FIG. 13 is a cross-sectional illustration of a single R2CIS for API with a perforated tube that separates the field-free transfer region from a central sample reaction region:

FIG. 14 is a cross-sectional view of a device containing a single R2CIS that directs reagent ions to a sample surface where sample ions are generated and swept into the device for transport to a remote focusing region:

FIG. 15 is a cross-sectional illustration of a single R2CIS for transfer of both positive and negative reagent ions to the sample reaction region with subsequent and simultaneous collection and focusing of different polarity sample ions; and FIG. 16 is a cross-sectional illustration of a single R2CIS that is arranged for transfer of reagent ions into a differential mobility spectrometer.

DETAILED DESCRIPTION OF THE INVENTION

The invention will be described with reference to the drawing Figures in which FIGS. 1, 2A, 2B, and 2C illustrate a basic preferred embodiment of the invention that employs a Remote Reagent Chemical Ionization Source, hereafter referred to as a R2CIS.

Figure 1:
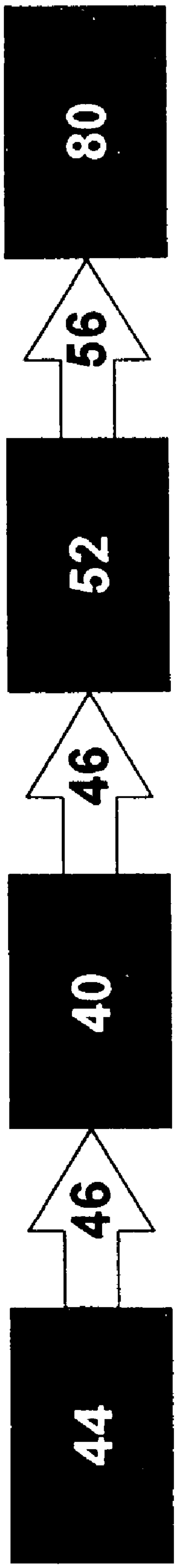
FIG. 1 is a block diagram, showing sequentially, the R2CIS region, the field-free transfer region, the reaction or sample ionization region, and the sample ion collection region.

FIG. 1 shows the general sequence of hardware and events. Reagent ions are created in the R2CIS reagent ion source region 44 and move along ion trajectory 46 to a field-free transfer region 40. Passage of reagent ions into a reaction or sample ionization region 52 causes sample ions to be produced, which move via sample ion trajectories 56 to a sample ion collection region 80.

Figure 2A:
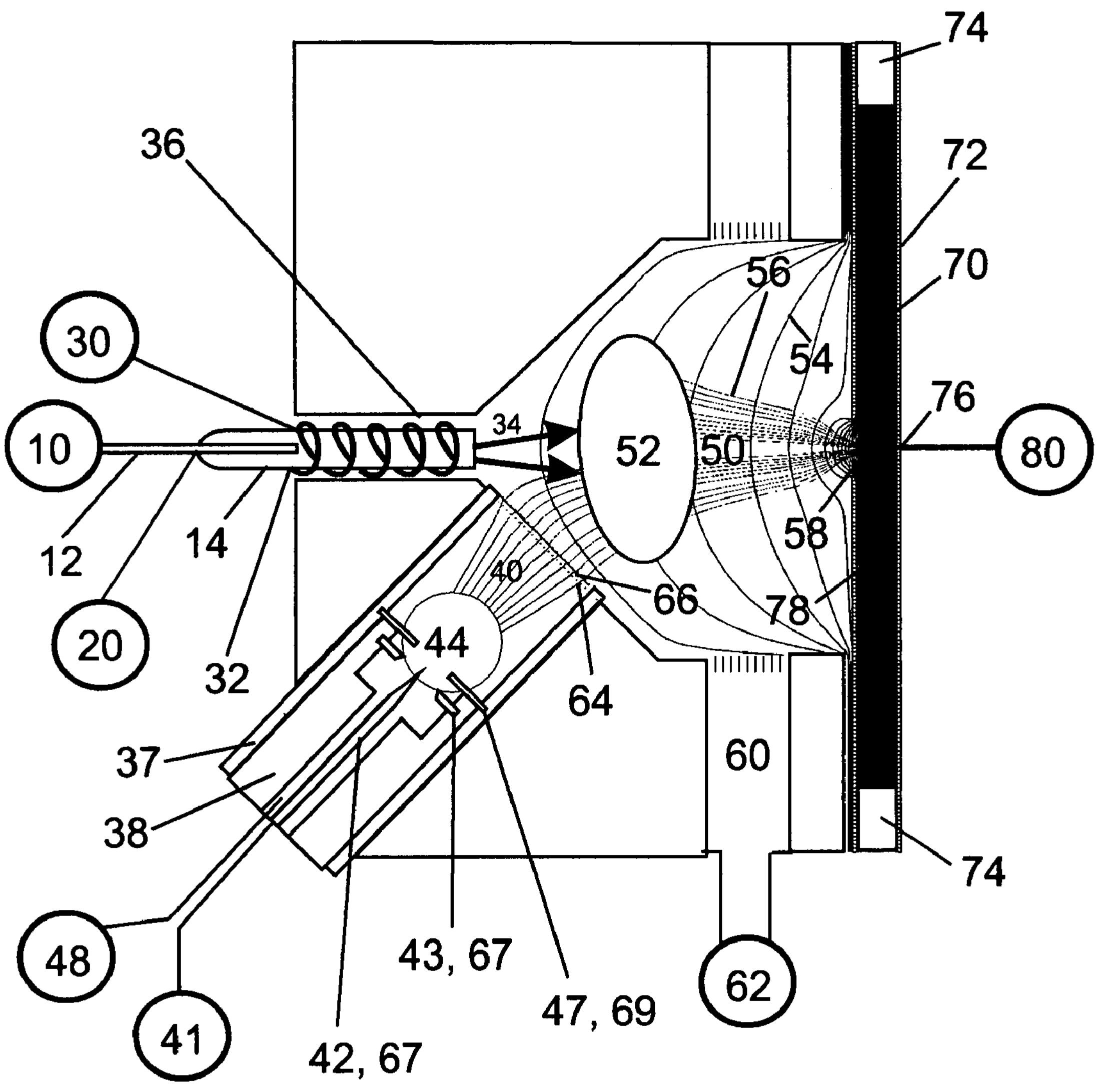
FIG. 2A is a cross-sectional illustration of R2CIS sources for API with a laminated high transmission element (L-HTE) separating the field-free transfer region from a central sample reaction region and subsequent transfer of sample ions to collection and subsequent analysis means.

Referring now to FIG. 2A, reagent ion species are generated in the R2CIS reagent ion source region 44 by discharge ionization from a first electrode (needle) 42 biased relative to a second electrode 43. The voltage differential applied between the two discharge electrodes is supplied by a conventional high voltage supply source 67. Reagent gas is supplied to reagent ion source region 44 from a reagent gas source 48. The gas may be heated prior to introducing it into the reagent ion source region 44. Needle electrode 42 is isolated from the reagent source region wall 37 by insulator 38. The field-free transfer region 40 is shielded from the high voltage of the discharge region by field-shielding element 47. Field-free transfer region 40, in turn, is separated from a central sample reaction region 52 by means of a laminated high transmission element (L-HTE) comprising an inner high transmission electrode 64 and an outer high transmission electrode 66. Gas flow from reagent gas source 48 is directed on-axis with the needle electrode 42 facilitating the transfer of gas discharge produced reagent species through the opening in the field-shielding element, into the field-free transfer region 40.

Sample from a source 10 is delivered to a nebulizer 14 by a sample delivery means 12 through an ion source entrance wall 36. This embodiment contains a heated nebulizer for nebulization and evaporation of sample streams emanating from liquid chromatographs and other liquid sample introduction devices. The liquid sample is heated, nebulized, and vaporized by the input of nebulization gas from a nebulization gas source 20 and by heat from heating coils 23 generated by a nebulizer heat source 30. The nebulizer produces a sample aerosol flow 34 with the sample being vaporized into the gas-phase and proceeding into a reaction or sample ionization region 52.

Direct current potentials are applied to the nebulizer heat source 30, electrodes 42, 43, inner-HT electrode 64, outer-HT electrode 66, and to the reagent source wall 37. The sample may be heated as well by passing or directing a heated gas over the sample or by illuminating the sample with infra-red light or a laser, thereby vaporizing the sample and forming gas-phase molecules which migrate into the reaction or sample ionization region 52 where reagent ions interact with the these gas-phase molecules forming gas-phase ions. The sample may be also heated by passing a heated gas over the sample. This heated gas may be the same gas present in the ionization region or added to the reaction region from an auxiliary source. Both the electric potentials and means for heating the sample may be controlled manually by an operator of the device or may be initiated by an operator but the process of ion generation, sample heating, and sampling of gas-phase ions will ordinarily be controlled by a computer.

Under the influences of the applied DC potentials on the elements, walls, and lenses, essentially all of the gas-phase ions in the sample ion-sampling or funnel region 50, including reagent and sample ions, take on a series of sample ion trajectories 56, move through equipotential lines 54, and are focused through the funnel aperture 58 in the funnel aperture wall 78, into a deep-well region 70 through an exit aperture 76 in the deep-well lens 72 into the sample ion collection region 80. The deep-well lens 72 is isolated from the funnel aperture wall 78 by an insulator ring 74.

Exit aperture 76 has a diameter that is sized to restrict the flow of gas into the sample ion collection region 80. In the case of vacuum detection, such as mass spectrometry in the sample ion collection region 80, typical aperture diameters are 100 to 1000 micrometers. The sample ion collection region 80 in this embodiment is intended to be the vacuum system of a mass spectrometer (interface stages, optics, analyzer, detector) or other low-pressure, intermediate pressure or atmospheric pressure ion and particle detectors. Excess sample and reagent gases in the sample ion-sampling or funnel region 50 are exhausted through an exhaust outlet 60 and delivered to an exhaust destination 62. Pressure regulation can also be provided between exhaust outlet 60 and exhaust destination 62.

Figure 2B:
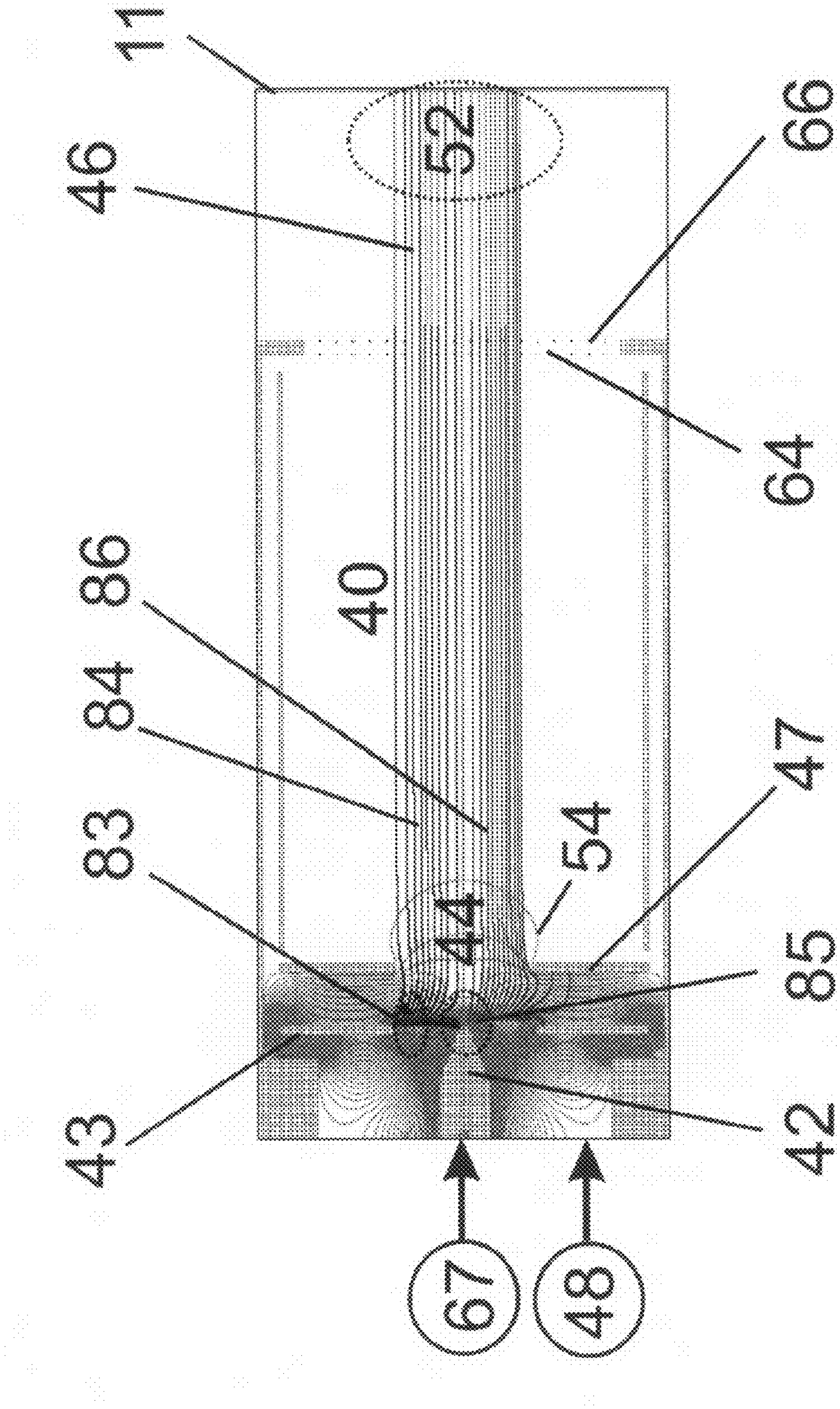
FIG. 2B is a cross-sectional illustration of a remote reagent chemical ionization source (R2CIS) for atmospheric pressure ionization (API) showing component parts and ion trajectories.
Figure 2C:
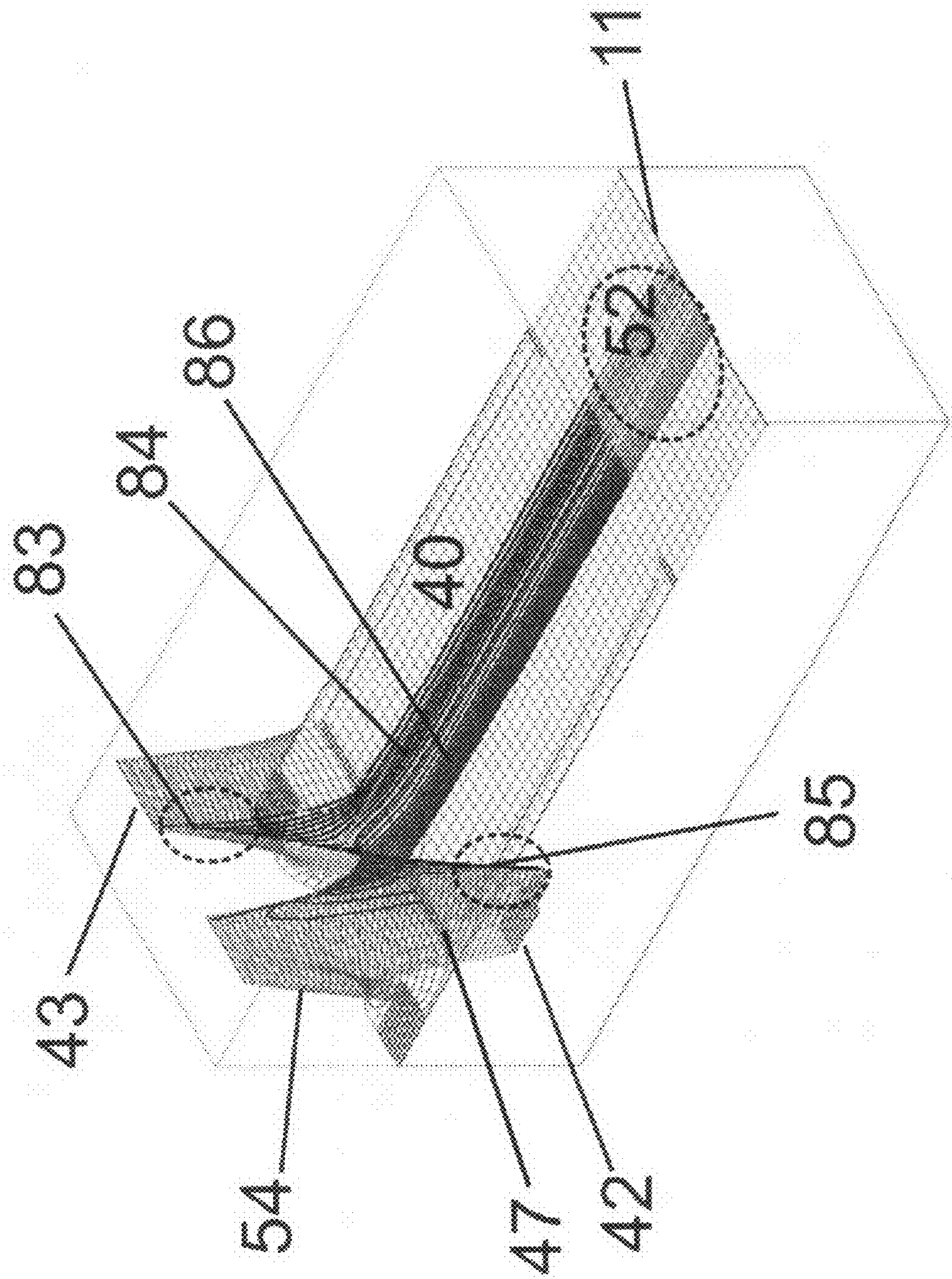
FIG. 2C is a potential energy surface of the R2CIS showing the trajectories of both positive and negative polarity ions moving from the high-field discharge region to the field-free transfer region and on to the sample to be ionized.

FIGS. 2B and 2C are potential energy diagrams illustrating a single R2CIS such as that one shown in cross-section in FIG. 2A. The diagrams show, respectively, a cross-section (2B), then a three-dimensional view (2C) of simultaneous positive and negative reagent ion formation and movement through a field free region 40 toward a sample. There are both a positive reagent ion generation region 83, and a negative reagent ion generation region 85, that produce, respectively, positive ion trajectories 84 and negative ion trajectories 86.

Figure 3:
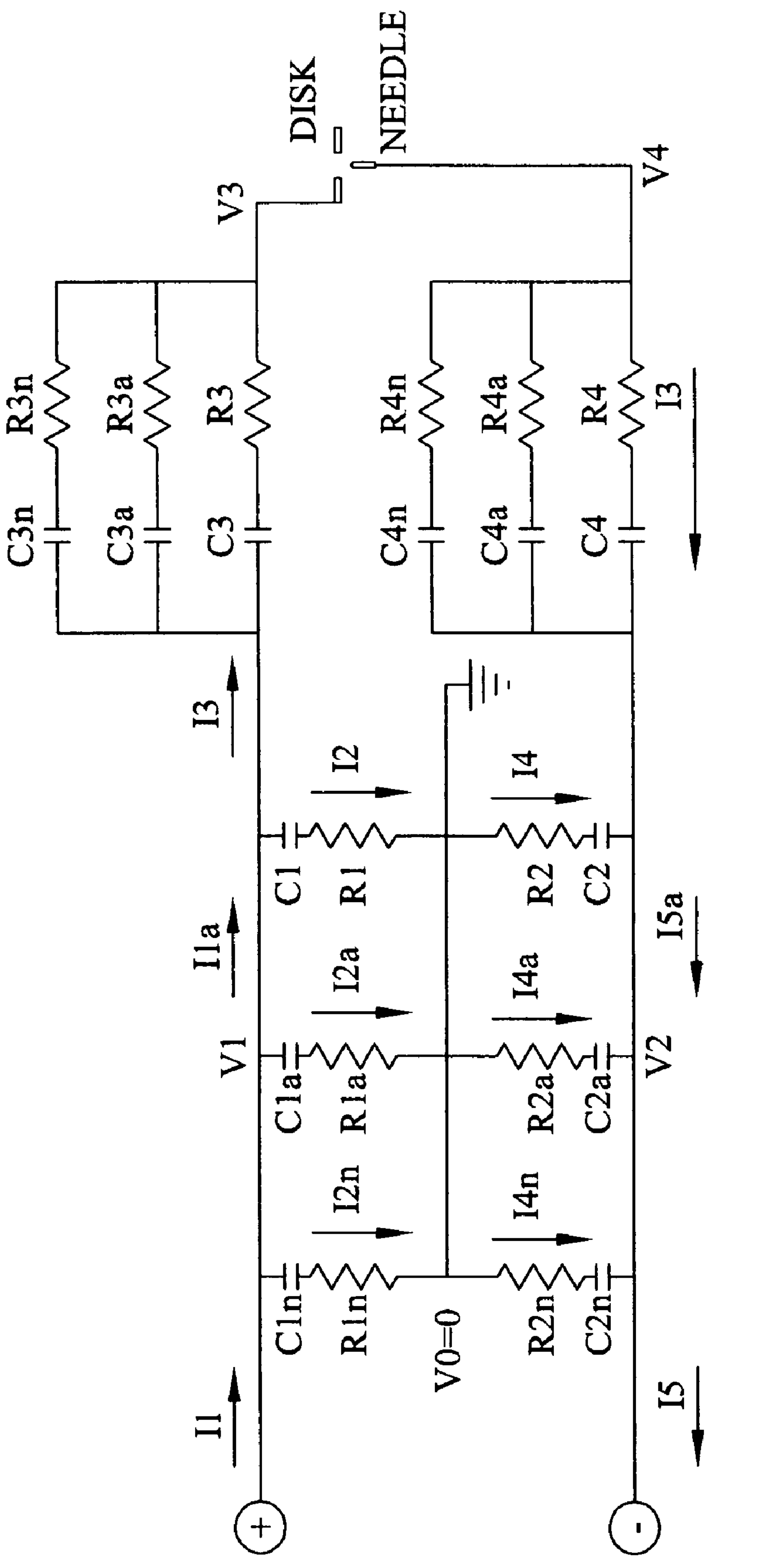
FIG. 3 depicts a circuit to control gas discharge and reagent ion production (needle attached to cathode)
Figure 5:
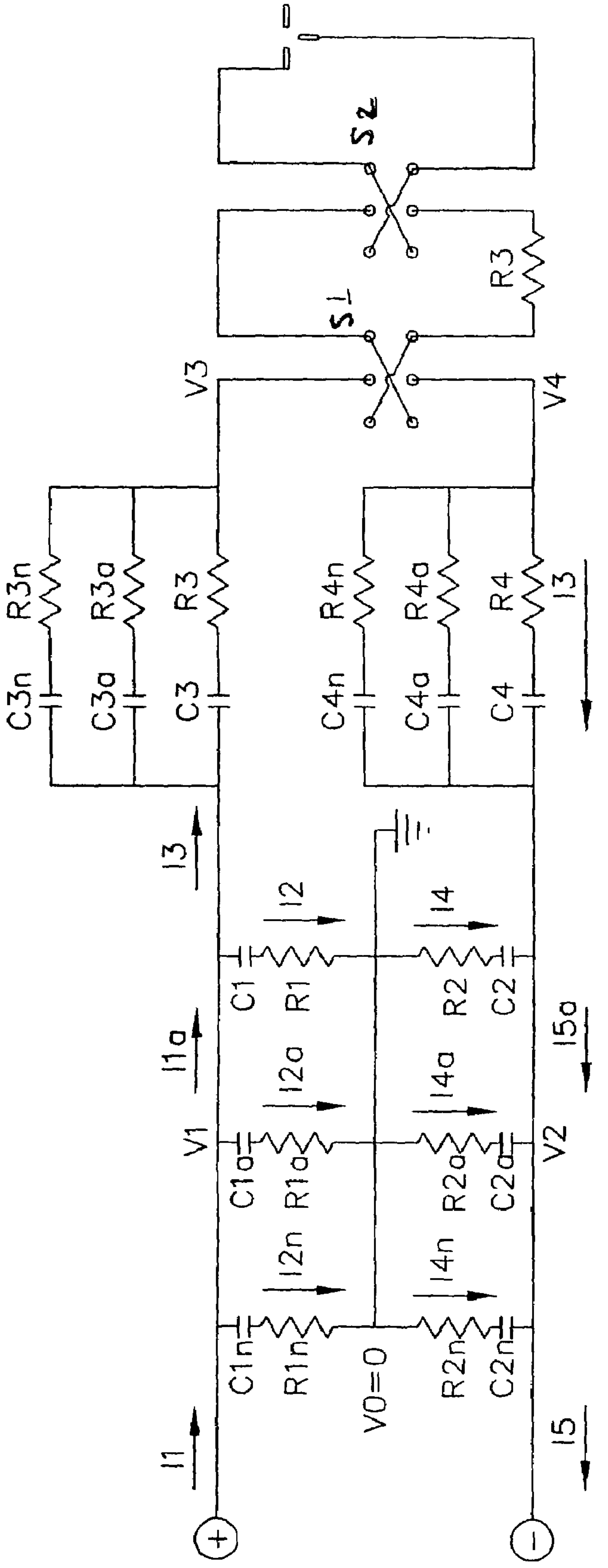
FIG. 5 depicts a circuit to control gas discharge and reagent ion production.

FIGS. 3, 4 and 5 depict circuits for the control of gas discharge and reagent ion production; FIG. 3 illustrating the case in which the needle electrode is attached to the cathode and FIG. 4 illustrating the case in which the needle electrode is attached to the anode. In both FIGS. 3 and 4, V=voltage, I=current, C1, C1*a*, . . . , C1*n*=switch contacts whereby extremely rapid changes can be made in a portion of the overall circuit through the selections of any resistor from the set R1, R2, . . . , R1*n*. Similarly, selection of combinations of C2, . . . , C2*n*, C3, . . . , C3*n*, and C4, . . . , C4*n* will result in the selection of resistors from the sets R2, . . . , R2*n*, R3, . . . , R3*n*; and R4, . . . , R4*n*, producing instantaneous changes in the voltage and current across the discharge electrodes, with concomitant changes in the production of reagent ion types and amounts. Note that each set of switch contacts and resistors can also be a variable resistor with off as one of its terminal settings.

The circuit diagram of FIG. 5 depicts the general case wherein rapid switching between the disc and plate as anode and cathode and vice-versa is through switches S1 and S2. Other descriptions and definitions are as in FIGS. 3 and 4.

Figure 6:
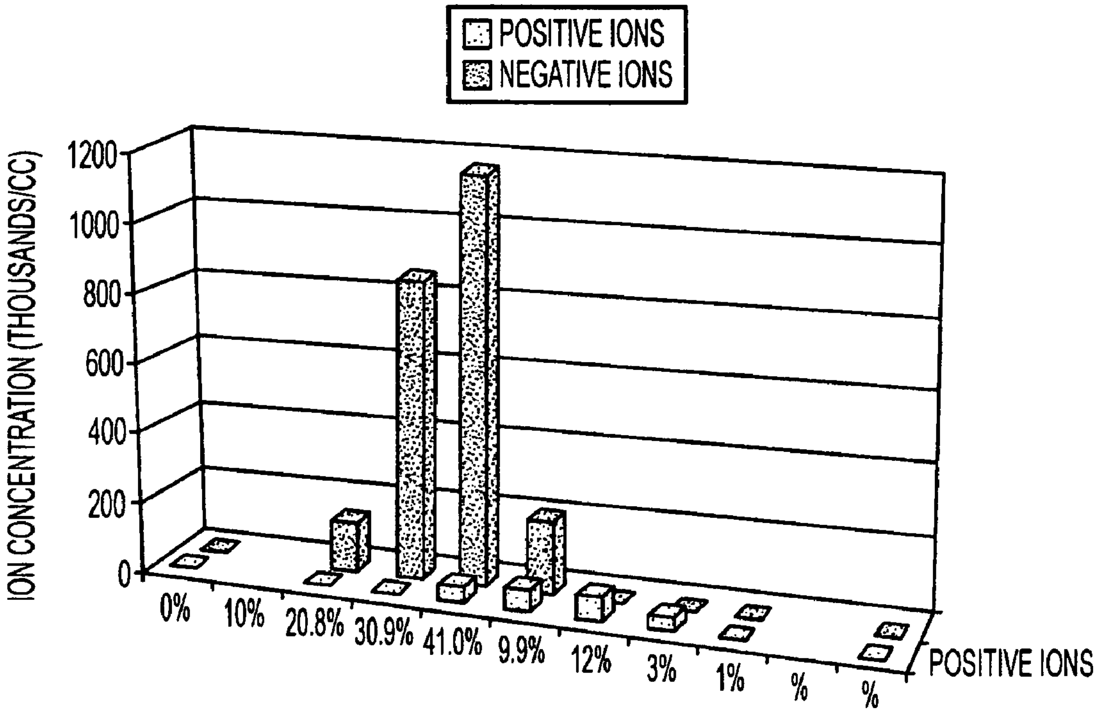
FIG. 6 is a graphical representation of the distribution of positive and negative reagent ions as a function of percent total voltage that is applied to the anode.

The use of a resistor or resistors connected at one end to ground and at the other to the power supply and gas discharge anode, and of a resister or resistors connected at one end to ground and at the other to the power supply and gas discharge cathode, enables the production of positive, negative or both positive and negative ions (FIG. 6) depending upon the ratio of resistances in this circuit (FIGS. 3-4, R1 and R2—variable values, R3 and R4 values don't matter). It does this as the potential difference across the gas discharge is moved from entirely above ground, to entirely below ground, through a region where one element of the gas discharge device is above ground, while the other is below ground.

The ratio of R1 to R2 determines the ion output. Current and power are varied by connecting resistors directly between the power supply anode and the gas discharge anode and/or between the power supply cathode and the gas discharge cathode. These resistors (FIGS. 3, 4, and 5, R3 and R4) control current and power used in the gas discharge. For gases with a low breakdown potential, these resistors limit current to eliminate arcing in the gas discharge and aid in establishing a steady glow or corona. If the sum of R3 and R4 is maintained constant, so is the current across the discharge. Zero is a valid resistance value for R3 and R4.

By altering the values of resistors R1 to R4, a wide variety of currents and powers across the gas discharge device are obtained under conditions where both elements of the gas discharge device are positive or negative, or one element is positive and the other is negative. FIG. 7 shows, for example, different operating conditions whereby dramatic changes in amounts and types of reagent ions are realized. The amounts of the positive ion $(H_2O)^2H^+$ are made to increase almost 3-fold, and a new reagent ion $O_2^+$ appears. These changes are made in real-time by merely switching from one electronic control setting to another.

As shown in FIG. 8, depending on where the gas discharge device elements are relative to ground, as set by the values of R1 to R4, positive or negative or positive and negative ions can be obtained. FIG. 2C shows the creation, in a gas discharge device, of both positive and negative species on one side of a perforated barrier, giving rise to both positive and negative reagent ions after interaction with a reactant gas on the other side of the barrier. By changing the values of R1 to R4, negative ions can be effectively eliminated or positive ions can be significantly reduced, or both positive and negative ions can be produced simultaneously in air. In this way, the production of chemically useful reactant ions such as $O_2^-$ and $(H_2O)_nH^+$ can be controlled. FIG. 8 shows such results, where at certain voltages, essentially only positive or negative reactant ions are obtained, while at other voltages both positive and negative ions are obtained simultaneously.

By introducing resistors R1A and R2A, as shown in FIGS. 3, 4 and 5, the values of R1 and R2 can be dynamically changed without altering R1 and R2 and without shutting down or losing the gas discharge. Similarly, by introducing resistors R3A and R4A, the values of R3 and R4 can be dynamically changed without altering R3 and R4 and without shutting down or losing the gas discharge. By implementing multiple parallel circuits to R1 and R2, and R3 and R4, in the manner of R1A and R2A, and R3A and R4A, or by utilizing continuously variable resistors, digital control enabling wide ranges of currents and powers across the gas discharge can be achieved. Furthermore, the potential difference across the discharge can be located in regions relative to ground that will result in the production of positive, negative or positive and negative ions simultaneously. Furthermore, as shown in FIGS. 8 and 9, different combinations of R1, R2, R3, and R4 can give rise to different or the same V3+V4, allowing selectivity of the reactant ions produced.

FIGS. 10*a* to 10*f* are cross-sectional illustrations of a number of alternative configurations of the R2CIS ion sources for field-free transfer of ions. FIG. 10*a* shows an axial needle electrode 42 and a disk-shaped counter-electrode 43 with a disk-shaped field-shielding element 47 downstream from the discharge region and held at a potential between the needle 42 and counter electrodes 43 to create a field-free transfer region 40 downstream from the discharge region.

FIG. 10*b* shows an axial needle electrode and a disk-shaped counter-electrode with a disk-shaped field-shielding element 47 downstream with a circular opening held at a potential between the needle and counter electrodes to create a field-free transfer region downstream from the discharge region. Additionally, high velocity gas introduced through concentric gas flow path 45 in the direction of the arrows facilitates the transfer of reactant species from the discharge plasma through the aperture in the field-shielding element 47. The concentric gas flow path 45 may comprise of a single concentric opening or a series of discrete tubes oriented radially around the axis of the needle electrode in order to maximize the linear velocity through the annulus while reducing the gas flow requirements. This produces the same linear velocity, but at a lower flow. Alternative path configurations are also possible to match the flow pathway with transfer element and electrode geometries.

FIG. 10*c* shows an axial hollow needle first electrode 42 and a disk-shaped second electrode 43 with a disk-shaped field-shielding element 47 downstream with a circular opening held at a potential between the needle and counter electrodes to create a field-free transfer region 40 downstream from the discharge region. Reagent gases or liquids can be introduced through the tube and additional reagent or transfer gases can be added concentrically. An important operational advantage of this configuration is the addition of liquid into the needle. This allows the operation in electrospray mode, pneumatically assisted electrospray mode, or other variations of liquid introduction such as simple spraying or corona assisted electrospray. In the configuration where liquid is introduced, liquid can be derived from a variety of liquid sources, including solvent pumps, liquid chromatographs, flow streams, capillary electrophoresis and related techniques, natural liquid sources, process streams, and other liquid flow sources. The liquid source 49 can provide chemical species that contribute to the production of reagent species in the reagent ion source region 44 or they can be sample components to be analyzed downstream. Alternatively, region 44 can serve as a sample ion source. For the liquid introduction from liquid sample streams the R2CIS is also serving as a sample reaction region. In essence, regions 44 and 52 are combined. Gaseous sample introduction at or near the dregion 44 results in sample product ions being delivered through the field-shielding element into the field-free transfer region as is shown in FIG. 10*b*

FIG. 10*d* shows two off-axis discharge electrodes 42, 43 with a disk-shaped field-shielding element 47 downstream held at a potential between the two discharge electrodes to create a field-free transfer region downstream from the discharge region. Reagent and transfer gases, or combinations thereof, and liquids can be introduced through an insulating tube 38 on axis with the field-shielding element.

FIG. 10*e* shows two off-axis discharge electrodes 42, 43 positioned outside of an insulated transfer tube with a disk-shaped field-shielding element 47 downstream held at a potential between the two discharge electrodes to create a field-free transfer region downstream from the discharge region. Reagent and transfer gases, or combinations thereof, and/or liquids can be introduced through the insulated tube on axis with the field-shielding element. This configuration allows the discharge to be contained within the insulating tube 38, allowing reagent gas to be in a more controlled plasma, not being exposed directly to the electrode surfaces.

FIG. 10*f* shows a plurality of R2CIS sources oriented in a coplanar array. While four sources are illustrated, a lesser or greater number of R2CIS sources may be employed. Such arrays are geometric combinations of reagent sources that can be patterned to optimize transmission of ions through any number of field-free region geometries to deliver the reagent cross-section to the reaction region or through a differential mobility spectrometer (DMS) 87 (FIG. 16) to optimize the sample ion yield. The significant advantage of arrays is the reduction in size (as the processes are scalable). This can result in significantly reduced gas load through the field-free transfer region and significantly reduce voltages applied to the discharge electrodes. The benefit is lower power, lower flow, more efficient reagent mixing with sample, and more precise spatial delivery of reagents to the reaction region.

Multiple R2CIS sources oriented around a single sample reaction region constitute another preferred embodiment of our invention, and that embodiment is illustrated in FIGS. 11A and 11B. In this preferred embodiment, reagent ions are generated in more than one place in the annular space around the reaction or sample ionization regions 52*a* and 52*b*; these multiple field-free transfer regions are designated 40*a* and. Each field-free transfer region 40*a*, 40*b* has an associated set of electrodes 42*a*, 43*a*, 42*b*, 43*b*, respectively and field-shielding elements 47*a*, 47*b*. Reagent ions are transferred from the field-free region through a planar laminated high-transmission element such as those described in U.S. Pat. No. 6,818,889, and consist of an inner high-transmission (HT) electrode or just inner-HT electrode 64*a*, 64*b* and an outer high-transmission electrode or just outer-HT electrode 66*a*, 66*b* populated with slotted openings (not shown), a funnel aperture wall 78, and a deep-well lens 72. Substantially all of the reagent ions generated in a reagent ion source region 44*a*, 44*b* take on a series of reagent ion trajectories 46*a*, 46*b* as they flow from field-free transfer regions 40*a*, 40*b*, through the inner 64*a*, 64*b* and outer-HT electrodes 66*a*, 66*b* and into the sample ion-sampling or funnel region 50, where the reagent ions undergo ion-molecule reactions with the sample to make gas-phase sample ions in reaction or sample ionization region 52*a*, 52*b*. FIGS. 3-9 show the circuits used to control reagent ion production, demonstrate the types of reagent ions that can be produced, and show the simultaneous production of positively and negatively charged reagent ions. FIG. 11B is the same as FIG. 11A except the HT electrodes that separates the field-free reactant source regions from a central sample reaction region are omitted. Reagent ions may also be transferred from the field-free transfer region 40 to reaction or sample ionization region 52 through an open tube.

Another embodiment of this invention is shown in FIG. 12. In this embodiment, an atmospheric pressure ionization source employs a perforated closed end tube 51 as a transport means for ions from the field-free transfer region 40 to the reaction or sample ionization region 52. Reagent ions are dispersed in the reaction region through perforation holes 53 to facilitate efficient mixing of reagent ions with sample. This embodiment has been designated as using a field-free reagent closed tube.

FIG. 13 shows as an additional embodiment an atmospheric pressure ionization source having a perforated open end tube 57 as a transport means for ions from the field-free transfer region 40 to the reaction or sample ionization region 52. Reagent ions are dispersed in the reaction region through perforation holes 53 to facilitate efficient mixing of reagent ions with sample. This embodiment is designated as having field-free reagent tubes. The perforated open-end tube 57 is connected to exhaust outlet 60 to allow some of the gas load from the R2CIS to pass through the tube to exhaust while a fraction of the reagent ions are dispersed into the reaction or sample ionization region 52. Pressure regulation can also be provided between exhaust outlet 60 and exhaust destination 62.

An alternative approach to the use of this invention is illustrated in FIG. 14 in which the focusing region 55 is separated from the sample. The components comprising this embodiment for analyzing surface derived samples include a field free source of reagent ions that are directed at a sample surface arranged with means to sample product species either in a pulsed or continuous manner. It has particular application for analysis of samples derived from materials situated on a surface 11 by directing reagent ions from a R2CIS onto the sample surface which is separated from the focusing region 55 by a transfer umbilical 81. Reaction or sample ionization region 52 is located at or near the sample surface in this embodiment, and sample ions are transmitted to the focusing region 55 by pulling an exhaust stream 59 from the focusing region 55 by the action of a pump at exhaust destination 62. Pulsing can occur both with introduction of reagent and with sampling of product ions. Reagent ions can be gated to the sample reaction region by bias of inner-HT electrode 64 and outer-HT electrode 66.

FIG. 15, in another alternative embodiment, provides simultaneous detection of both positive and negative ions. It incorporates two funnel-well optical configurations orthogonal to the sample reaction region in order to attract product ions of different polarities of product ions to their respective collectors and analyzers 88, 89. Such configurations are disclosed in one or more of the patents and patent applications that were acknowledged as related art herein. Other approaches that achieve the simultaneous segregation of opposite polarity product species can be used as well.

FIG. 16 illustrates yet another alternative and favored embodiment in which differential mobility spectrometry (DMS) is used to selectively filter reagent ions. This embodiment incorporates the plates 87 from a differential mobility spectrometer into a field-free transfer region 40. The DMS preferred operating mode is with asymmetric or symmetric alternating voltage waveforms with an accompanying variable DC compensation voltage in order to select specific reagent species on the basis of differential mobility for transmission to the sample reaction region. This embodiment has particular application where a high current of reagent ions is creating interferences, space charge, or suppression of sample product signal. Alternatively a sample from source 10*b* can be introduced after the reagent ion source region, but before entry into the field-free transfer region 40 to enable sample ions to be generated before entry into the DMS. This embodiment allows the selective filtration of sample ions by the DMS prior to passage to the sample ion collection region 80, where subsequent sample ion detection and identification can be done.

Other reagent gases from reagent gas source 48*b* may also be added to reaction or sample ionization region 52 to produce labeled, tagged, or selectively reacted sample related product ions. In general, all of the various embodiments of this invention operate in the same fashion, and all utilize a plasma or gas discharge to create energetic species. A gas or mixture of gases is passed through the plasma or discharge, producing ions and energetic species such as positive and negative ions, excited state neutral species, metastable neutral species, excited state ions, electrons, radicals, proton donors, proton acceptors, electron donors, electron acceptors, adduct donors, adduct acceptors, and other primary and secondary products of discharge processes. Control of the species and amounts of species leaving the discharge region is achieved electronically by using the circuitry shown in FIG. 3, 4 or 5. These species then leave the gas discharge region through a small perforation or a plurality of small perforations in a thin barrier—the field-shielding element. This barrier can be made of an insulating material or a conductive material. Alternatively, it can be made such that the perforations are surrounded by one material while the remainder of the barrier is made of another. In the case where either the entire barrier or the portions of the barrier surrounding the perforations is conductive, this conductive material can be electrically biased to encourage or to limit the passage of selected species through the barrier. This barrier can prevent the electrical field existing in the gas discharge region from progressing past the barrier. In this way, a source of ions in a field-free environment is created.

Once through the barrier, the energetic species encounter a region through which is passed a gas or mixture of gases that react with the said ions, energetic species, or combination thereof, producing charged gas-phase ions such as protonated species, electron attached species, deprotonated species, electron detached species, adducted species, including reagent ions such as $O_2^-$ and $(H_2O)_nH^+$. These reagent ions can be moved by aerodynamic means, by electronic means, and by a combination of both means. The ions can be focused or accelerated by such means. These reagent ions can be moved to contact and interact with samples, which can contain one substance or comprise a mixture of several substances. Further, the samples can be neutral gas-phase sample species such as eluents from gas chromatograms, eluents from sprayers emitted from liquid chromatographs, neutral species evaporated from sample surfaces at or near the sample reaction region, neutral species on sample surfaces at or near the sample reaction region, sample streams carried from sample locations by carrier gases that are located remotely from reaction region, and process gas, liquid or solid streams (FIGS. 2, 11-14).

The interaction of the reactant ions with sample can produce, among others, protonated species, electron attached species, deprotonated species, electron detached species, adducted species, sample charged fragment species, reaction products of labeled or tagged species, reaction products of polymerization reactions, multicharged species, and radical species, in addition to ions from the sample materials.

The sample-derived ions can be used to determine the presence or absence of sample materials. Sample material ions can be detected or collected using gas-phase ion detectors such as mass spectrometry, ion mobility spectrometry, and differential mobility spectrometry, fluorescence, luminescence, and spectroscopy or spectrometry of any kind alone or in combination. Further, any method that can detect sample ions derived directly from the sample can be used to detect and identify the sample immediately.

A gas with a low breakdown potential can be used in the gas discharge device to produce energetic species that will ionize atoms or molecules outside of the discharge region. For example, energetic helium species obtained in the gas discharge can be used to ionize molecules in air or other gases or mixture of gases outside the discharge region. The ions so produced, are termed reagent ions, and include, for example, $O_2^-$ and $(H_2O)_nH^+$. Those ions are sufficiently energetic and reactive to ionize many samples, analytes, or chemicals of military and commercial interest to produce sample ions for subsequent detection. In this case, there is an energy flow that begins with the production of various species of ionized and metastable gas atoms or molecules in the discharge. These species then can transfer energy to different reagent ions, that in turn cause ionization of sample chemicals. The sample chemicals can be introduced into a device containing the R2CIS. Alternatively, by projecting the stream of reagent ions in space, chemicals in vapor, liquid and solid phases can be ionized and subsequently captured, detected and identified.

A gas discharge produces reagent ions that can subsequently and directly ionize a wide variety of chemicals in vapor, liquid or solid form. Of particular interest is the direct ionization of solid explosives including EGDN, DNT, TNT, Tetryl, RDX and HMX. These explosives have having vapor pressures varying over seven orders of magnitude. In these cases, the ionization process does not result in extensive fragmentation of the molecules. Instead, this soft ionization process produces only a few ion types from each molecule, thereby maximizing the sensitivity obtained upon subsequent detection and identification of the ions.

Controlling the gas discharge and the ions subsequently produced is important in controlling the operation of and expanding the capabilities of this ionization system. Important parameters for controlling the energy in a gas discharge are the geometry between the two elements of the discharge device, the shape and materials of the elements and the voltage and current applied to the device to produce a gas discharge between the elements. Through variations of these parameters and others, pulsed and continuous discharges can be been produced, as can glow discharges, coronas, and arcing. Depending upon gas discharge conditions, different ions and metastable species can be produced, either as products in their own right or as energetic species that can subsequently produce other ions as end products. Controlling this latter process using simple means is important because the discharge device can serve as a simple, inexpensive, field-free source of positive or negative ions or of positive and negative ions simultaneously, depending upon the operating conditions selected.

The description of the invention that is set out above should not be construed as limiting the scope of the invention but as merely providing illustrations of some of the presently preferred embodiments of this invention. Other variations and modifications will be apparent to one skilled in this art as, for example the sample can be introduced off-axis or orthogonal to the funnel region; gases and gas mixtures such as helium and nitrogen and reactive gases can be added to the ionization region to form specified reagent ions; the laminated high-transmission element can have other shapes, such as spherical, conical shaped, or other geometries; the number of laminates of the laminated high-transmission elements can vary depending on the source of ions, the type of ion-collection region or a combination of both; the device may be self-contained including an ion source, power supplies, computer, gases, and ion analyzer and may be small enough to be placed on a small table or workbench or mounted on wall in a building or the device may be packaged as a probe that includes an ion source, power connections, inlets for gases and the like designed to be added to existing mass spectrometers and ion mobility analyzers, and similar analytical devices.

Thus the scope of the invention should be determined by the appended claims rather than be limited to the exemplary embodiments presented.

We claim:

1. A method for the collection and focusing of gas-phase ions comprising:

a. creating a stream of gas-phase reagent ions at substantially atmospheric pressure in a field-free environment;

b. transporting said reagent ions from said field-free environment into a reaction region;

c. introducing a sample stream into said reaction region and allowing it to react with said reagent ions to produce product ions;

d. collecting said product ions and transporting them to an analytical device; and e. identifying the material from which said product ions were derived.

2. An ion gun for the production of reactant or reagent ions from a reagent gas comprising:

a discharge needle having a prescribed electrical DC potential;

a counter-electrode having a prescribed DC potential that is less than the potential of said discharge needle;

a shielding electrode disposed downstream of said counter-electrode, the potential of said shielding electrode being equal to or greater than the potential of said counter-electrode; and a means for delivering a gaseous stream in a gas flow path, said gaseous stream containing reagent gas, the flow of said gaseous stream providing reagent gas and ions formed therein with sufficient urging to sweep substantially all of the reagent gas and ions through the shielding electrode into a passage adjacent to said counter-electrode whereby substantially all of said reagent gas and ions are collected.

3. The ion gun of claim 2 wherein said passage comprises a tube that is constructed of metal, of dielectric material, or combinations of metal and dielectric material.

4. The ion gun of claim 2 wherein said passage exits into a reaction region that is maintained at or near atmospheric pressure, and wherein a laminated high-transmission element is positioned between the passage exit and said reaction region, said high transmission element comprising a surface having a plurality of openings and alternating layers of insulator and metal laminates.

5. The ion gun of claim 4 including means to apply a prescribed potential to said laminated high-transmission element, said potential set at a level whereat substantially all of the ions in said passage are urged out of the passage into said reaction region, and means to introduce a sample into said reaction region to thereby form gas-phase sample product ions.

6. The ion gun of claim 5 wherein said sample introduction means is adapted to introduce a gas sample, a liquid aerosol sample, or mixtures of gases and liquid aerosols into said reaction region.

7. The ion gun of claim 5 including means to collect said sample product ions and to introduce said collected sample product ions into analyzer means.

8. A remote reagent ion generator, comprising:

means defining a gas flow path;

an ion source for producing ionic reactant species from a reactant gas disposed within said flow path;

means for delivering a gaseous stream containing a reactant gas to said gas flow path, said gaseous stream arranged to sweep substantially all of said reactant gas and ionic species from said ion source through a shielding electrode positioned downstream from and adjacent to said counter-electrode;

a gas passage means extending from said shielding electrode at one end to a reaction region at its other end for transport of reactant gas and ionic species from the ion source to the reaction region;

a high-transmission element disposed between the other end of the gas passage and the reaction region, said high-transmission element isolating the electric fields of the discharge source from the reaction region;

means to introduce a sample into said reaction region to thereby react said sample with reactant ionic species created by said ion source to produce gas-phase sample ions; and means to collect said gas-phase sample ions.

9. The ion generator of claim 8 wherein said ion source includes a needle electrode and a counter-electrode, and means to impress an electrical potential across the two electrodes.

10. The ion generator of claim 8 wherein said means for delivering a gaseous stream comprises a temperature controlled, metered supply of gas.

11. A method for the production of charged species at atmospheric or near atmospheric pressures comprising:

supplying a gaseous stream containing a reactant gas to a remote ion source that comprises an electrode and a counter-electrode;

setting the potential difference between said electrodes at a level whereat charged reactant species of said reactant gas are produced;

setting the flow rate of said gas stream to the ion source at a level whereat the reaction gas and reactant species are urged through a shielding electrode into a passage;

impressing an electrical potential upon said shielding electrode and setting the magnitude of said electrical potential at a level whereat a field-free or near field-free reaction region is established downstream of said passage;

introducing a sample material into said reaction region; and reacting said sample material with said reactant species in the reaction region to produce sample product ions or charged particles.

12. The method of claim 11 wherein said reactant species are focused away from said passage by means of a laminated, high-transmission lens disposed between said passage and said reaction region.

13. The method of claim 11 including the step of focusing said sample product ions or charged particle toward a collection point.

14. The method of claim 13 in which said focused sample product ions or charged particles are analyzed using a low-pressure ion or particle detector.

15. The method of claim 11 wherein the sample material introduced into the reaction region is a gas.

16. The method of claim 11 wherein the sample material introduced into the reaction region is a liquid aerosol.

17. A remote reagent ion generator comprising:

an ion source comprising an enclosure having entry means for a reagent gas at one end thereof, said enclosure having a first electrode disposed therein adjacent the entry means, and a counter-electrode downstream from said first electrode, said first electrode electrically biased relative to said counter-electrode to produce a corona discharge between the electrodes;

a field-shielding element disposed at a location downstream from said counter-electrode, said element arranged to create a field-free region within said enclosure downstream from said element by shielding that region from fields produced by the corona discharge;

means for defining a sample reaction region, said means located adjacent said field-free region and separated therefrom by means of a high transmission element, said element arranged to allow reagent gas and reagent ions created by said corona discharge to pass therethrough;

means for supplying an analyte to said sample reaction region for reaction with reagent ions to form analyte ions; and means to focus said analyte ions away from said sample reaction region toward a collector or analyzer.

18. The ion generator of claim 17 including a plurality of ion sources arranged about a single sample reaction region.

19. The ion generator of claim 17 wherein said means for supplying an analyte to said sample reaction region comprises a nebulizer.

20. The ion generator of claim 17 wherein said high transmission element comprises an inner high transmission electrode and an outer high transmission electrode.

* * * * *

UNITED STATES PATENT AND TRADEMARK OFFICE

CERTIFICATE OF CORRECTION

PATENT NO. : 7,569,812 B1

APPLICATION NO. : 11/544252
DATED : August 4, 2009
INVENTOR(S) : Timothy P. Karpetsky et al.

It is certified that error appears in the above-identified patent and that said Letters Patent is hereby corrected as shown below:

IN THE REFERENCES CITED SECTION - OTHER PUBLICATIONS -

On Page 3, Column 1, Line 3, please change "Jan./Feb., 1998 [retrieved on May 15, 2008], pp., Retrieved from the" to -- Jan./Feb., 1998 [retrieved on May 15, 2008], 28 pp., Retrieved from the --

On Page 3, Column 1, Line 7, please change "[online], Dec. 26, 2005 [retrieved on Apr. 28, 2006], p., Retrieved" to -- [online], December 26, 2005 [retrieved on Apr. 28, 2006], 1 p., Retrieved --

On Page 3, Column 1, Line 9, please change "pho?title=Chemi-Ionization." to -- php?title=Chemi-Ionization. --

On Page 3, Column 1, Line 29, please change "ization-Detectors/Helium/rs/64.html." to -- ization-Detectors/Helium/rs64.html. --

On Page 3, Column 1, Line 50, please change "Willoughby, R., Sheehan, E., Mitrovich, A., "A Global Views of" to -- Willoughby, R., Sheehan, E., Mitrovich, A., "A Global View of --

On Page 3, Column 2, Line 13, please change "Lovelock, J. E., "A Sensitivie Detector for Gas Chromatography," to -- Lovelock, J. E., "A Sensitive Detector for Gas Chromatography," --

On Page 3, Column 2, Line 19, please change "from the Internet: http://wiv.vdi/berzirksverein.de/HenneVDI. pdf." to -- from the Internet: http://wiv.vdi-bezirksverein.de/HenneVDI.pdf. --

On Page 3, Column 2, Line 37, please change "Lee, T. D., et al., "An EHD Sources for the Mass Spectral Analysis of" to -- Lee, T. D., et al., "An EHD Source for the Mass Spectral Analysis of --

UNITED STATES PATENT AND TRADEMARK OFFICE

CERTIFICATE OF CORRECTION

PATENT NO. : 7,569,812 B1
APPLICATION NO. : 11/544252
DATED : August 4, 2009
INVENTOR(S) : Timothy P. Karpetsky et al.

It is certified that error appears in the above-identified patent and that said Letters Patent is hereby corrected as shown below:

On Page 3, Column 2, line 38, please change “Peptides,” Proceedings of the 36th ASMA Conference on Mass Spec-” to -- Peptides,” Proceedings of the 36th ASMS Conference on Mass Spec- --

Signed and Sealed this

Twenty-seventh Day of October, 2009

David J. Kappos

David J. Kappos
*Director of the United States Patent and Trademark Office*